US012615319B2

(12) United States Patent
Arvedahl

(10) Patent No.: US 12,615,319 B2
(45) Date of Patent: Apr. 28, 2026

(54) DATA SERIALIZATION IN A COMMUNICATION NETWORK

(71) Applicant: Telefonaktiebolaget LM Ericsson (publ), Stockholm (SE)

(72) Inventor: Svante Arvedahl, Stockholm (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 322 days.

(21) Appl. No.: 18/260,398

(22) PCT Filed: Jan. 8, 2021

(86) PCT No.: PCT/IB2021/050108
§ 371 (c)(1),
(2) Date: Jul. 5, 2023

(87) PCT Pub. No.: WO2022/148991
PCT Pub. Date: Jul. 14, 2022

(65) Prior Publication Data
US 2024/0056513 A1      Feb. 15, 2024

(51) Int. Cl.
*H04L 69/08*      (2022.01)
*H04L 69/16*      (2022.01)
*H04W 4/20*      (2018.01)
*H04W 80/08*      (2009.01)

(52) U.S. Cl.
CPC .............. *H04L 69/08* (2013.01); *H04L 69/16* (2013.01); *H04W 4/20* (2013.01); *H04W 80/08* (2013.01)

(58) Field of Classification Search
CPC ......... H04L 69/08; H04L 69/16; H04L 69/24; H04W 4/20; H04W 80/08
See application file for complete search history.

(56) References Cited

U.S. PATENT DOCUMENTS

2014/0359709 A1* 12/2014 Nassar ................ H04L 65/1083
726/4

OTHER PUBLICATIONS

"Comparison of data-serialization formats", Wikipedia, <https://web.archive.org/web/20201111140914/https://en.wikipedia.org/wiki/Comparison_of_data-serialization_formats>, Oct. 23, 2020, 1-12.
(Continued)

*Primary Examiner* — Mansour Oveissi
(74) *Attorney, Agent, or Firm* — Murphy, Bilak & Homiller, PLLC

(57) ABSTRACT

A first communication endpoint in a communication network receives signaling from a second communication endpoint in the communication network. The signaling indicates a format according to which the second communication endpoint will serialize and/or deserialize data to be communicated between the first and second communication endpoints. In some embodiments, the signaling is received during a procedure for establishing a data interface over which data is to be communicated between the first communication endpoint and the second communication endpoint. The first communication endpoint, in some embodiments, generates serialized data to be transmitted to the second communication endpoint, and/or processes serialized data received from the second communication endpoint, according to the format indicated by the received signaling.

21 Claims, 14 Drawing Sheets

(56) References Cited

OTHER PUBLICATIONS

3GPP, "3GPP TS 24.250 V17.0.0", 3rd Generation Partnership Project; Technical Specification Group Core Network and Terminals; Protocol for Reliable Data Service; Stage 3 (Release 17), Dec. 2020, 1-39.

Palm, Emanuel, et al., "Syntactic Translation of Message Payloads Between at Least Partially Equivalent Encodings", 2019 IEEE International Conference on Industrial Technology (ICIT), Feb. 13, 2019, 1-6.

* cited by examiner 40-1

```
ver1 struct WindowSchedS 1
{
  S16    windowId 1;
  S16    windowSfn 2;
  S16    windowSf 3;
  S16    windowSlot 4;
};
message WindowSchedReqS 2
{
  U32        SigHeader 1;
  S16        noOfWindows 2;
  U16        padding0 3;
  WindowSchedS(1) windowSched 4 len (2);
};
```

40-2

```
ver2 struct WindowSchedS 1
{
  S16    windowId 1;
  S16    windowSfn 2;
  S16    new1 default=1 5;
  S16    new2 default=2 6;
  S16    windowSf 3;
};
message WindowSchedReqS 2
{
  U32        SigHeader 1;
  U16        winSchedId 5;
  U16        direction default=1 6;
  S16        noOfWindows 2;
  U16        padding0 3;
  WindowSchedS(1) windowSched 4 len (2);
};
```

*FIGURE 4A*

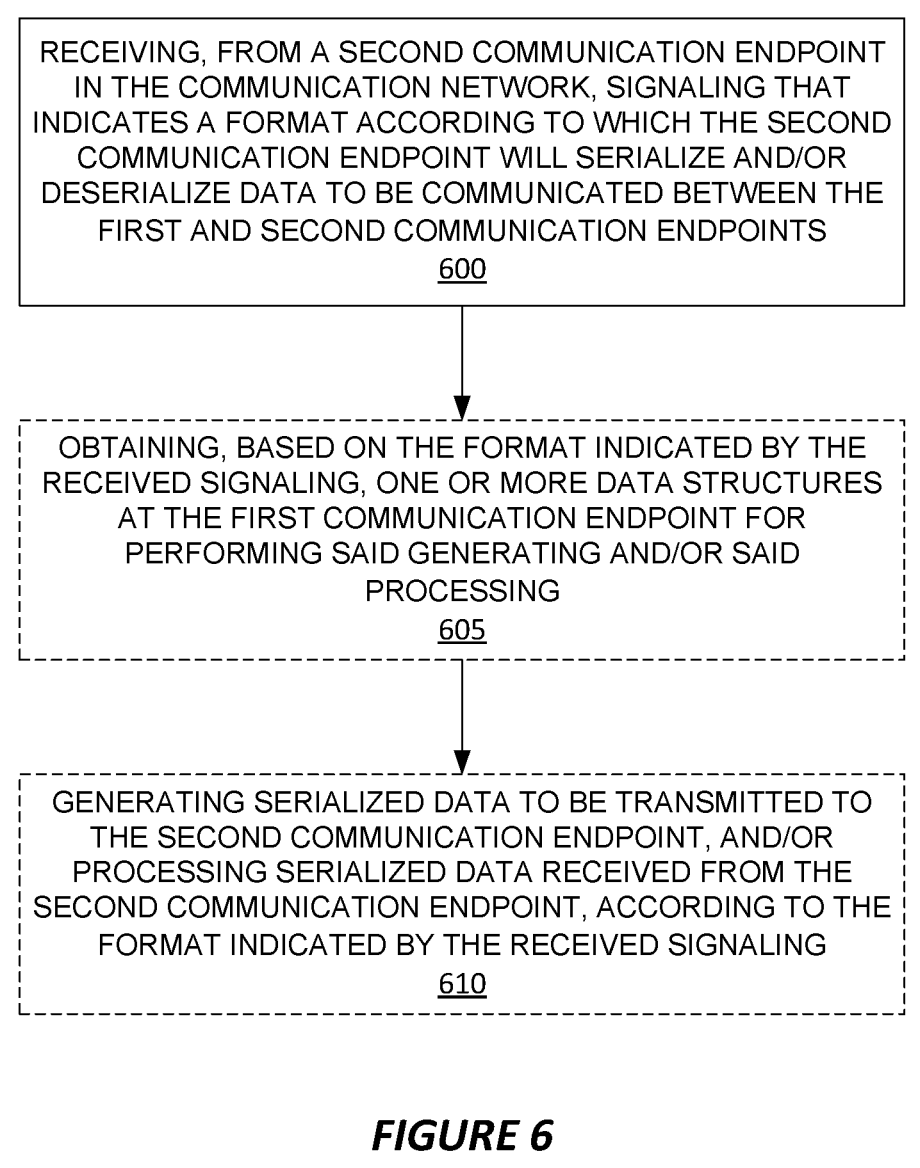

RECEIVING, FROM A SECOND COMMUNICATION ENDPOINT IN THE COMMUNICATION NETWORK, SIGNALING THAT INDICATES A FORMAT ACCORDING TO WHICH THE SECOND COMMUNICATION ENDPOINT WILL SERIALIZE AND/OR DESERIALIZE DATA TO BE COMMUNICATED BETWEEN THE FIRST AND SECOND COMMUNICATION ENDPOINTS
600

OBTAINING, BASED ON THE FORMAT INDICATED BY THE RECEIVED SIGNALING, ONE OR MORE DATA STRUCTURES AT THE FIRST COMMUNICATION ENDPOINT FOR PERFORMING SAID GENERATING AND/OR SAID PROCESSING
605

GENERATING SERIALIZED DATA TO BE TRANSMITTED TO THE SECOND COMMUNICATION ENDPOINT, AND/OR PROCESSING SERIALIZED DATA RECEIVED FROM THE SECOND COMMUNICATION ENDPOINT, ACCORDING TO THE FORMAT INDICATED BY THE RECEIVED SIGNALING
610

FIGURE 6

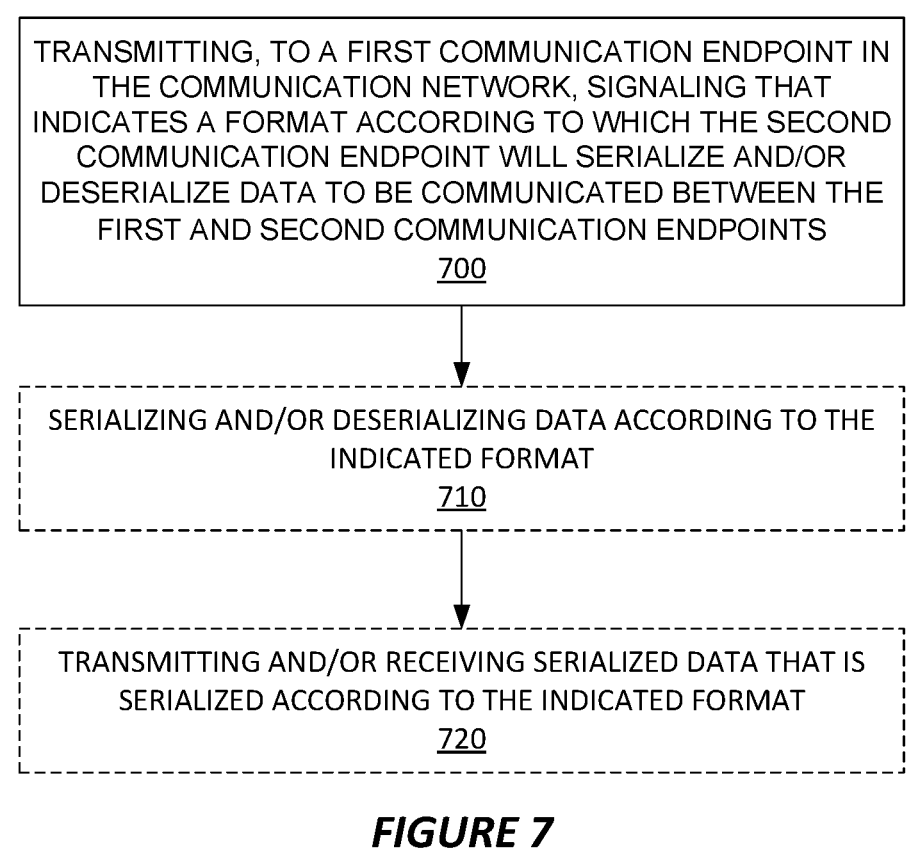

TRANSMITTING, TO A FIRST COMMUNICATION ENDPOINT IN THE COMMUNICATION NETWORK, SIGNALING THAT INDICATES A FORMAT ACCORDING TO WHICH THE SECOND COMMUNICATION ENDPOINT WILL SERIALIZE AND/OR DESERIALIZE DATA TO BE COMMUNICATED BETWEEN THE FIRST AND SECOND COMMUNICATION ENDPOINTS
700

SERIALIZING AND/OR DESERIALIZING DATA ACCORDING TO THE INDICATED FORMAT
710

TRANSMITTING AND/OR RECEIVING SERIALIZED DATA THAT IS SERIALIZED ACCORDING TO THE INDICATED FORMAT
720

*FIGURE 7*

DATA SERIALIZATION IN A COMMUNICATION NETWORK

TECHNICAL FIELD

The present application relates generally to a communication network, and relates more particularly to data serialization in such a network.

BACKGROUND

Different computer languages structure data in different ways. Serialization transforms language-specific data into a language-agnostic form, such as a stream of bytes. The serialized data can then be transmitted or stored in a language-agnostic manner. After transmission or storage, deserialization transforms the serialized data back into the language-specific data, e.g., to effectively create a semantically identical clone of the original data. Serialization and deserialization thereby facilitate the communication or storage of language-specific data using a language-agnostic mechanism. This proves advantageous especially if the interface or protocol via which the data is communicated or stored changes often, provided that the processing overhead attributable to serialization and deserialization is affordable.

In some contexts, challenges nonetheless exist in keeping the serializer and deserializer sufficiently in sync with respect to the format according to which data is serialized and deserialized. If the serializer updates the format according to which it serializes data, and the deserializer independently updates the format according to which it deserializes data, those updates may be incompatible so as to render serialized data unrecoverable at the deserializer.

SUMMARY

According to some embodiments herein, a communication endpoint signals the format according to which it will serialize and/or deserialize data. Informed about this format, another communication endpoint can then generate or process serialized data in a way that accommodates the other communication endpoint's use of that format. This may entail, for example, translating serialized data between different formats, as needed so that the other communication endpoint can send and receive serialized data in the signaled format.

Some embodiments notably signal the format for serialization and/or deserialization of data in advance of that data being communicated. The format may for example be signaled during a procedure for establishing the data interface over which the data is to be communicated. Other embodiments additionally or alternatively signal the format via an interface, protocol stack layer, and/or message different than that via which the data itself is communicated. Signaling the format in advance and/or via a different interface, protocol stack layer, or message than that used for communicating the data advantageously reduces the overhead incurred at runtime and/or on the interface/layer for data. This may in turn reduce the processing and/or bandwidth resources needed for communicating the data.

More particularly, embodiments herein include a method performed by a first communication endpoint in a communication network, e.g., a radio network node in a radio access network. The method includes receiving, from a second communication endpoint in the communication network, signaling that indicates a format according to which the second communication endpoint will serialize and/or deserialize data to be communicated between the first and second communication endpoints.

In some embodiments, the format indicated by the received signaling dictates at least one of any one or more of: (i) into which message types and/or message fields data is structured; (ii) a byte offset, within a byte stream that represents a message, at which each message field is respectively serialized; (iii) an order in which message fields are serialized; and (iv) a default value for at least one message field.

In some embodiments, the signaling that indicates the format is received during a procedure for establishing a data interface over which data is to be communicated between the first communication endpoint and the second communication endpoint. Alternatively or additionally, the signaling that indicates the format may be received over a control plane interface that is different than a data interface over which data is to be communicated between the first communication endpoint and the second communication endpoint. In yet other embodiments, the signaling that indicates the format may alternatively or additionally be received at a layer of a communication protocol stack that is higher than a layer of the communication protocol stack at which serialized data is to be communicated between the first communication endpoint and the second communication endpoint. In still other embodiments, the signaling that indicates the format may be received in a message that is separate from a message in which serialized data is received from the second communication endpoint.

In some embodiments, the method further comprises generating serialized data to be transmitted to the second communication endpoint, and/or processing serialized data received from the second communication endpoint, according to the format indicated by the received signaling. In one such embodiment where the format according to which the second communication endpoint serializes and/or deserializes data is a second format, and where the serialized data received from the second communication endpoint is serialized according to the second format, processing the serialized data received from the second communication endpoint may comprise translating the received serialized data from the second format to a first format according to which the first communication endpoint serializes and/or deserializes data, or reading at least a portion of the received serialized data from a receive buffer according to the second format. For example, the first format and the second format may be different versions of a common base format. In another embodiment, where the format according to which the second communication endpoint serializes and/or deserializes data is a second format, generating serialized data to be transmitted to the second communication endpoint may comprise serializing data according to a first format and translating the serialized data from the first format to the second format, for transmission to the second communication endpoint, or writing to a transmit buffer at least a portion of the serialized data to be transmitted, according to the second format. For example, the first format and the second format may be different versions of a common base format.

In either case, the method may further comprise obtaining, based on the format indicated by the received signaling, one or more data structures at the first communication endpoint for performing such generating and/or such processing. In this case, the one or more data structures may be stored persistently in memory across multiple exchanges of serialized data between the first and second communication endpoints. For example, the one or more data structures may include one or more translation tables that indicate read and/or write operations on a byte-by-byte or chunk-by-chunk basis for translating serialized data between the format indicated by the received signaling and a format according to which the first communication endpoint serializes and/or deserializes data.

In some embodiments, the second communication endpoint is a radio network node that is split into a centralized unit, CU, and one or more distributed units, DUs, wherein the signaling that indicates the format is received from the CU.

In some embodiments, the communication network is a radio access network, and the first communication endpoint is a first radio network node, and the second communication endpoint is a second radio network node.

In some embodiments, the communication network is a radio access network, and the first and second communication endpoints are endpoints for inter-process communication between first and second processes in a radio network node.

In some embodiments, the data comprise data on how the first and second communication endpoints are to share frequency spectrum and/or aggregate frequency carriers.

Embodiments herein also include a corresponding method performed by a second communication endpoint in a communication network. The method includes transmitting, to a first communication endpoint in the communication network, signaling that indicates a format according to which the second communication endpoint will serialize and/or deserialize data to be communicated between the first and second communication endpoints. In some embodiments, the format indicated by the signaling dictates at least one of any one or more of:

(i) into which message types and/or message fields data is structured; (ii) a byte offset, within a byte stream that represents a message, at which each message field is respectively serialized;

(iii) an order in which message fields are serialized; and (iv) a default value for at least one message field.

In some embodiments, the signaling that indicates the format is transmitted during a procedure for establishing a data interface over which data is to be communicated between the first communication endpoint and the second communication endpoint. Alternatively or additionally, the signaling that indicates the format may be transmitted over a control plane interface that is different than a data interface over which data is to be communicated between the first communication endpoint and the second communication endpoint. In yet other embodiments, the signaling that indicates the format may alternatively or additionally be transmitted at a layer of a communication protocol stack that is higher than a layer of the communication protocol stack at which serialized data is to be communicated between the first communication endpoint and the second communication endpoint. In still other embodiments, the signaling that indicates the format may be transmitted in a message that is separate from a message in which serialized data is transmitted from the second communication endpoint.

In some embodiments, the method further comprises serializing and/or deserializing data according to the indicated format. In these and other embodiments, the method may also comprise transmitting and/or receiving serialized data that is serialized according to the indicated format.

In some embodiments, the second communication endpoint is a radio network node that is split into a centralized unit, CU, and one or more distributed units, DUs, wherein the signaling that indicates the format is transmitted by the CU.

In some embodiments, the communication network is a radio access network, and the first communication endpoint is a first radio network node, and the second communication endpoint is a second radio network node.

In some embodiments, the communication network is a radio access network, and the first and second communication endpoints are endpoints for inter-process communication between first and second processes in a radio network node.

In some embodiments, the data comprise data on how the first and second communication endpoints are to share frequency spectrum and/or aggregate frequency carriers.

Of course, the present invention is not limited to the above features and advantages. Indeed, those skilled in the art will recognize additional features and advantages upon reading the following detailed description, and upon viewing the accompanying drawings.

BRIEF DESCRIPTION OF THE DRAWINGS

FIG. 4A is a block diagram of different formats of a message according to some embodiments.

FIG. 6 is a logic flow diagram of a method performed by a first communication endpoint in a communication network according to some embodiments.

FIG. 7 is a logic flow diagram of a method performed by a second communication endpoint in a communication network according to some embodiments.

DETAILED DESCRIPTION

Figure 1:
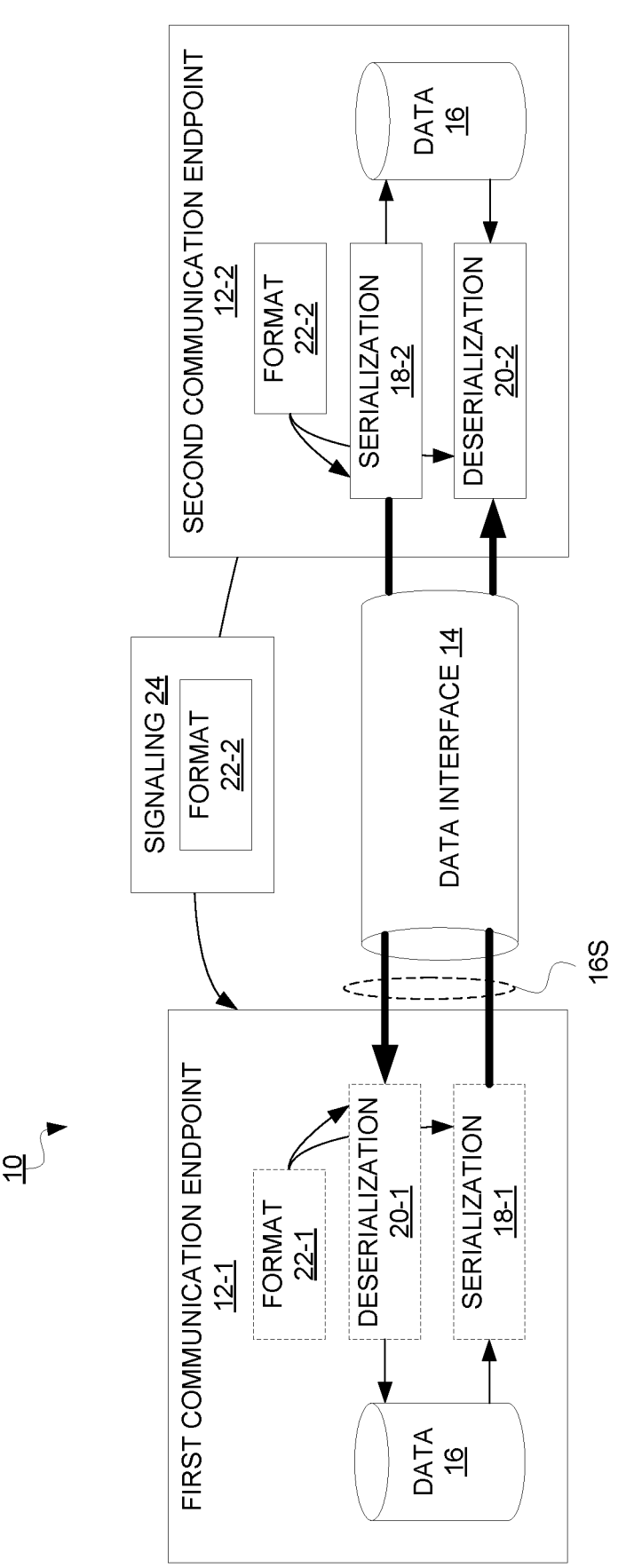
FIG. 1 is a block diagram of a communication network according to some embodiments.

FIG. 1 shows some embodiments of a communication network 10, e.g., a radio access network (RAN) of a wireless communication system. The communication network 10 includes first and second communication endpoints 12-1, 12-2, collectively referred to as communication endpoints 12. The communication endpoints 12 serve as the endpoints of a data interface 14 between the endpoints 12. In one embodiment, the communication endpoints 12 are network nodes, such that the data interface 14 is an inter-node interface. In this case, for instance, the communication endpoints 12 may be radio network nodes (e.g., base stations) in a RAN, and the data interface 14 may be a point-to-point interface (e.g., an Xn interface) between radio network nodes. In some embodiments, the second communication endpoint 12-2 is a radio network node that is split into a centralized unit, CU, and one or more distributed units, DUs. In another embodiment, the communication endpoints 12 are processes in the same network node, such that the data interface 14 is an intra-node, inter-process interface. In this latter case, for example, the processes may be processes implemented at respective first and second layers of a protocol stack, e.g., where the first and second layers can respectively correspond to Layer 1 (Physical) and Layer 2 (Medium Access Control, MAC), or where the first and second layers can respectively correspond to Layer 2 (MAC) and Layer 3 of the protocol stack.

Regardless, the communication endpoints 12 are configured to communicate data 16 between themselves using the data interface 14. The data 16 may be any type of data. For instance, the data 16 may be any type of data at a baseband layer of a wireless communication protocol stack. As one example, the data in this case may comprise data on how the first and second communication endpoints 12-1, 12-2 are to share frequency spectrum and/or aggregate frequency carriers. As another example, the data may configure cell-related resources or state, or configure device-related resources or state. In these and other embodiments, the data 16 may comprise one or more data structures. The data 16 may be specific to a certain computer language so as to be language-specific. Embodiments herein accordingly exploit data serialization in order to communicate the data 16 over the data interface 14 in a language-agnostic way.

As shown in FIG. 1, in order to send data 16 from the first communication endpoint 12-1 to the second communication endpoint 12-2, the first communication endpoint 12-1 performs serialization 18-1 in order to transform the data 16 into a language-agnostic form, such as a stream of bytes. The serialized data 16S may then be sent over the data interface 14 in a language-agnostic way to the second communication endpoint 12-2. Upon receiving the serialized data 16S, the second communication endpoint 12-2 performs deserialization 20-2 in order to transform the serialized data 16S back into the original data 16. Alternatively or additionally, in order to send data 16 from the second communication endpoint 12-2 to the first communication endpoint 12-1, the second communication endpoint 12-2 performs serialization 18-2 in order to transform the data 16 into a language-agnostic form. The serialized data 16S may then be sent over the data interface 14 in a language-agnostic way to the first communication endpoint 12-1. Upon receiving the serialized data 16S, the first communication endpoint 12-1 performs deserialization 20-1 in order to transform the serialized data 16S back into the original data 16.

According to embodiments herein, though, the first and second communication endpoints 12-1, 12-2 serialize and/or deserialize data according to respective formats 22-1, 22-2. The respective formats 22-1, 22-2 may dictate how data 16 is structured, e.g., into which message types and/or message fields the data 16 is to be structured. The respective formats 22-1, 22-2 may alternatively or additionally dictate how data 16 is serialized and/or deserialized. For example, the respective formats 22-1, 22-2 may dictate a byte offset, within a byte stream that represents a message, at which each message field is respectively serialized, an order in which message fields are serialized and/or deserialized, and/or the value(s) that data message field(s) are to have by default. As other examples, the respective formats 22-1, 22-2 may dictate a data type for each message field (including compound types such as structs), offsets in a byte stream where dynamic arrays are to be formed, and/or offsets in a byte stream where array length fields are to be formed.

In some embodiments, the format 22-2 according to which the second communication endpoint 12-2 serializes and/or deserializes data can be different from the format 22-1 according to which the first communication endpoint 12-1 serializes and/or deserializes data. Indeed, in one or more such embodiments, the communication endpoints 12 may be independently updatable in terms of the respective formats 22-1, 22-2 that they use for serialization and/or deserialization. In this case, then, even if the communication endpoints 12 start out using the same format for serialization and/or deserialization, the endpoints 12 may each independently update the format that they use, meaning that the formats 22-1, 22-2 can become different (i.e., out of sync) over time. For example, even if the endpoints 12 start out both using format A version 1.0, over time the first communication endpoint 12-1 may upgrade to format A version 2.1 whereas the second communication endpoint 12-2 may upgrade to format A version 2.5, e.g., such that the formats 22-1, 22-2 end up being different versions of a common base format A. In these and other cases, then, the formats 22-1, 22-2 at any given time may differ from one another, e.g., in terms of the message fields into which data 16 is structured, an order in which message fields are serialized and/or deserialized, and/or the value(s) that message field(s) are to have by default.

Some embodiments herein facilitate communication of serialized data 16S over the data interface 14, in a way that effectively accommodates for the respective formats 22-1, 22-2 according to which the endpoints 12 serialize and/or deserialize data. These embodiments may thereby enable communication of serialized data 16S over the data interface 14 even in cases where the first and second communication endpoints 12 serialize and/or deserialize data according to different formats.

More particularly, as shown in FIG. 1, the second communication endpoint 12-2 in some embodiments transmits signaling 24 to the first communication endpoint 12-1. The signaling 24 indicates the format 22-2 according to which the second communication endpoint 12-2 will serialize and/or deserialize data. The format 22-2 in some sense, then, defines or describes the data interface 14 from the perspective of the second communication endpoint 12-2. Reception of the signaling 24 at the first communication endpoint 12-1 thereby informs the first communication endpoint 12-1 about the format 22-2 according to which the second communication endpoint 12-2 will serialize and/or deserialize data. The first communication endpoint 12-1 may then account for the format 22-2 that the second communication endpoint 12-2 will use. For example, the first communication endpoint 12-1 may generate or process serialized data 16S in a way that accommodates the second communication endpoint's use of the signaled format 22-2. This may entail, for example, translating serialized data between the first and second formats 22-1, 22-2, as needed so that the second communication endpoint 12-2 can send and receive serialized data 16S in the signaled format 22-2.

Notably, the signaling 24 indicates the format 22-2 according to which the second communication endpoint 12-2 will serialize and/or deserialize data, as opposed to indicating the format according to which the second communication endpoint 12-2 has already serialized and/or deserialized data. This means that the signaling 24 in some embodiments provides advanced notice about the format 22-2 that the second communication endpoint 12-2 will use, rather than just-in-time notice or delayed notice. Indeed, the second communication endpoint 12-2 in some embodiments transmits the signaling 24 that indicates the format 22-2 for serialization and/or deserialization of data, in advance of that data being communicated. The format 22-2 may for example be signaled during a procedure for establishing the data interface 14 over which the data is to be communicated. In these and other embodiments, then, the timing of the signaling 24 is asynchronous with respect to the timing of the data communication. In fact, in some embodiments, the signaling 24 is sent before any data has been transmitted over the data interface 14. Regardless, signaling the format 22-2 in advance advantageously reduces the overhead incurred at run-time (i.e., when the data interface 14 is in service), which may in turn reduce the run-time processing and/or bandwidth resources needed for communicating the data.

In these and other embodiments, the signaling 24 may be sent once in advance of any data communication on the data interface 14, to indicate an initial format 22-2 that will be used by the second communication endpoint 12-2, and then thereafter sent only as needed to indicate any change in the format 22-2 to be used by the second communication endpoint 12-2. In this case, then, upon receiving the signaling 24 indicating the initial format 22-2 (e.g., during the setup procedure for the data interface 14), the first communication endpoint 12-1 may operate under the assumption that the second communication endpoint 12-2 will use the signaled format 22-2 unless and until subsequent signaling is received indicating that the second communication endpoint 12-2 will use a different format; that is, the indicated format persists across potentially multiple future data transmissions until the second communication endpoint 12-2 signals a change in that format. The same sort of assumption may be made for formats subsequently signaled during run-time operation, e.g., as part of format reconfiguration; that is, any signaled format persists unless and until a different format is signaled. Regardless, with the format persisting in this way across potentially multiple data transmissions made over time on the data interface 14, rather than each data transmission having to carry embedded serialization metadata or otherwise having to be accompanied by associated signaling indicating the format used for that particular data transmission, some embodiments advantageously eliminate or at least reduce the signaling overhead attributable at run-time to indicating the format for serialization and/or deserialization.

Additionally or alternatively to signaling the format 22-2 to be used for serialization and/or deserialization in advance, other embodiments signal the format 22-2 via an interface, protocol stack layer, and/or message different than that via which the data itself is communicated. In some embodiments, for example, the format 22-2 is signaled over a control plane interface (not shown) rather than the data interface 14, e.g., where the data communicated over the data interface is user plane data. The control plane interface may for instance be a Layer 3 interface. In these and other embodiments, the format 22-2 may be signaled via a protocol stack layer different from that at which the data interface 14 is implemented. The format 22-2 may for instance be signaled via a protocol stack layer that is higher than the layer via which the data is communicated, e.g., the format 22-2 may be signaled via a Layer 3 interface whereas the data is communicated over a Layer 1 or Layer 2 interface at baseband. Signaling the format via an interface, protocol stack layer, or message different than that via which the data is communicated similarly reduces the overhead imposed on the data interface 14. This may in turn reduce the processing and/or bandwidth resources needed for communicating the data over the data interface 14.

Regardless, with the format 22-2 signaled to the first communication endpoint 12-1, the first communication endpoint 12-1 may take any number of actions to accommodate for the second communication endpoint's use of that format 22-2. Such actions may include generating serialized data to be transmitted to the second communication endpoint 12-2, and/or processing serialized data received from the second communication endpoint 12-2, according to the format 22-2 indicated by the signaling 24.

Figure 2:
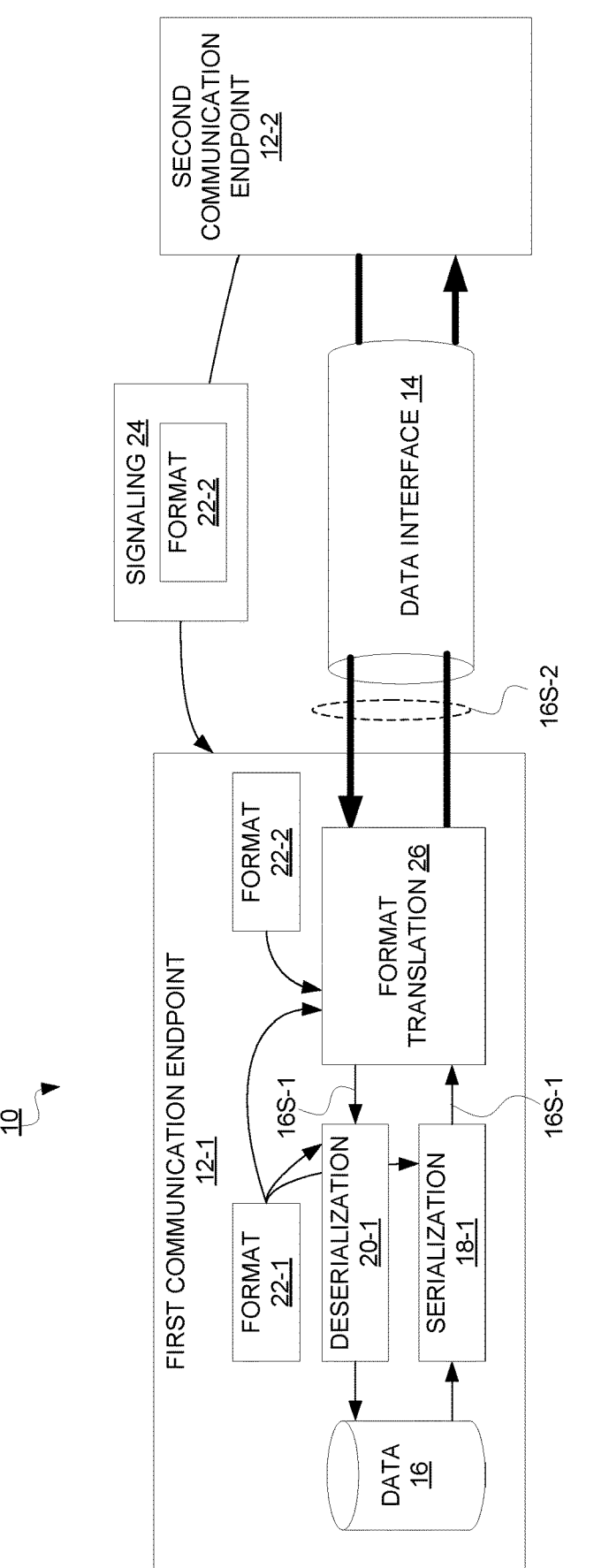
FIG. 2 is a block diagram of a communication network in which a communication endpoint performs format translation according to some embodiments.

FIG. 2 illustrates one example where the first communication endpoint 12-1 translates serialized data between the first and second formats 22-1, 22-2, as needed to accommodate for the second communication endpoint's use of the signaled format 22-2. As shown in FIG. 2 in this regard, the first communication endpoint 12-1 performs format translation 26 based on the format 22-2 signaled by the second communication endpoint 12-2 and based on the format 22-1 according to which the first communication endpoint 12-1 itself serializes and/or deserializes data.

Where the second communication endpoint 12-2 serializes data according to format 22-2, the first communication endpoint 12-1 correspondingly receives serialized data 16S-2 that is serialized according to format 22-2. According to some embodiments, format translation 26 by the first communication endpoint 12-1 entails translating the received serialized data 16S-2 from the signaled format 22-2 to the format 22-1 according to which the first communication endpoint 12-1 itself deserializes data. Format translation 26 thereby produces serialized data 16S-1 that is serialized according to format 22-1. The first communication endpoint 12-1 then performs deserialization 20-1 on the translated serialized data 16S-1, in order to deserialize the translated serialized data 16S-1 according to format 22-1. Translation between the formats 22-1, 22-2 at the first communication endpoint 12-1 in this way thereby enables the second communication endpoint 12-2 to just serialize data 16 according to format 22-2, without having to understand or even know about the format 22-1 according to which the first communication endpoint 12-1 deserializes data. Indeed, in some embodiments, the format translation 26 at the first communication endpoint 12-1 is transparent (i.e., unknown) to the second communication endpoint 12-2.

Alternatively or additionally, where the second communication endpoint 12-2 deserializes data according to format 22-2, the first communication endpoint 12-1 generates serialized data 16S-2 to be sent to the second communication endpoint 12-2 so that the data sent is serialized according to format 22-2. More particularly, according to some embodiments, the first communication endpoint 12-1 performs serialization 18-1 in order to serialize data 16 according to format 22-1. Serialization 18-1 thereby produces serialized data 16S-1 that is serialized according to format 22-1. The first communication endpoint 12-1 then performs format translation 26 in order to translate the serialized data 16S-1 from format 22-1 to the format 22-2 according to which the second communication endpoint 12-2 will deserialize the data. Format translation 26 in this case, then, produces serialized data 16S-2 that is serialized according to format 22-2. The first communication endpoint 12-1 then transmits the serialized data 16S-2, which is correspondingly received and deserialized by the second communication endpoint 12-2 according to format 22-2. Similarly in this case, translation between the formats 22-1, 22-2 at the first communication endpoint 12-1 in this way enables the second communication endpoint 12-2 to just deserialize data 16 according to format 22-2, without having to understand or even know about the format 22-1 according to which the first communication endpoint 12-1 serializes the data.

Figure 3A:
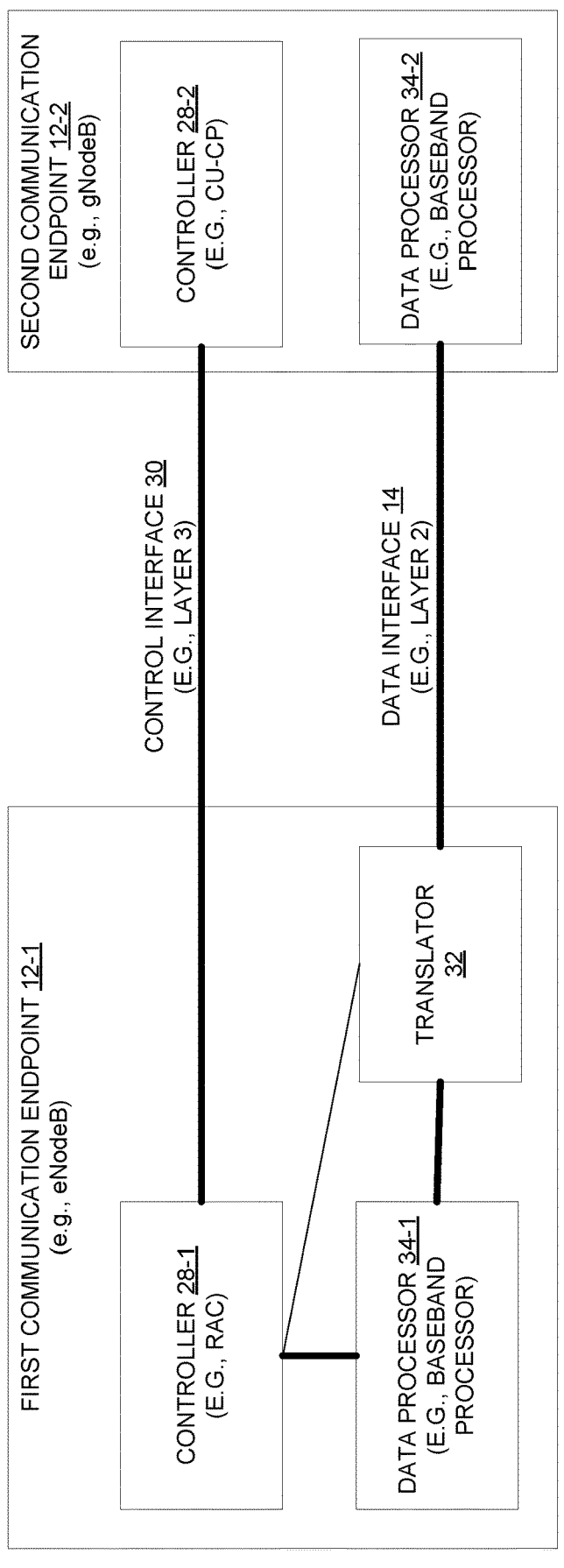
FIG. 3A is a block diagram of a communication network in which signaling is communicated over a control interface according to some embodiments.
Figure 3B:
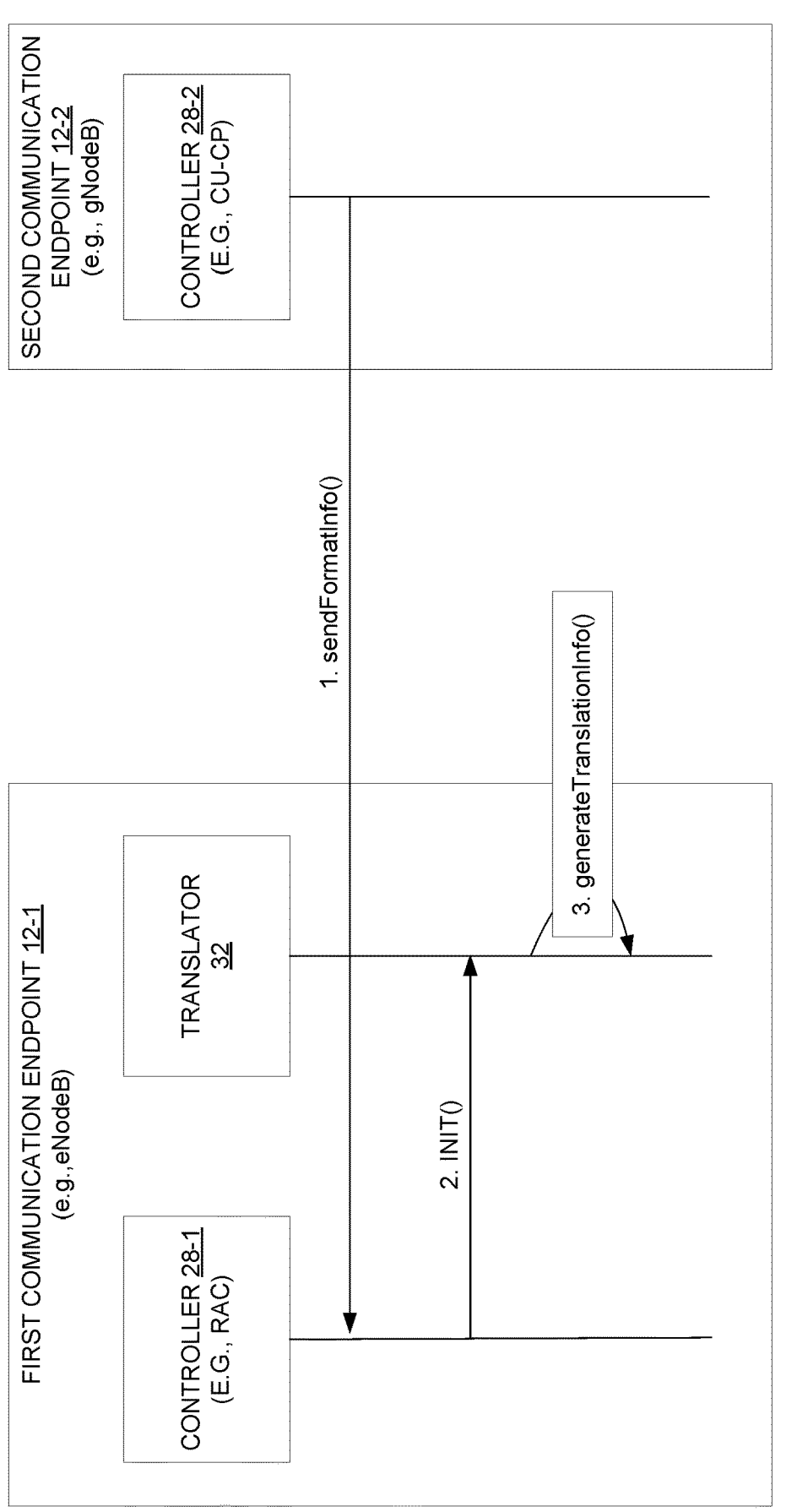
FIG. 3B is a call flow diagram between endpoints for communicating signaling and initializing translation according to some embodiments.
Figure 3C:
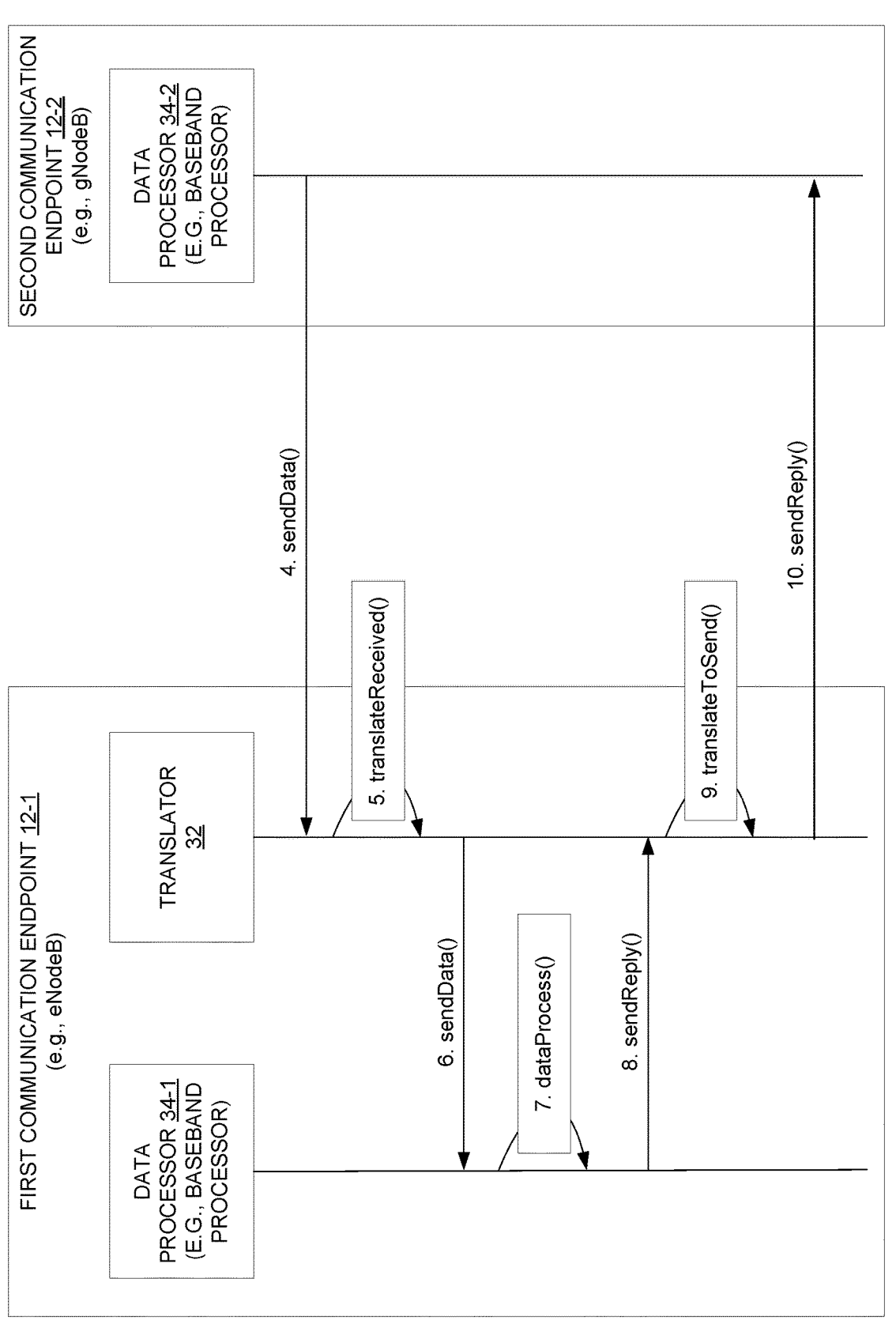
FIG. 3C is a call flow diagram between endpoints for performing format translation according to some embodiments.

FIGS. 3A-3C illustrate some embodiments in a context where the second communication endpoint 12-2 sends the signaling 24 to the first communication endpoint 12-1 over a control interface 30 that differs from the data interface 14 via which the data is communicated. As shown in FIG. 3A, the first communication endpoint 12-1 in this example includes a controller 28-1 that communicates over the control interface 30 with a controller 28-2 of the second communication endpoint 12-2. In embodiments where the first communication endpoint 12-1 is an eNodeB in a 4G RAN and the second communication endpoint 12-2 is a gNodeB in a 5G RAN, the controller 28-1 may be a Radio Access Control (RAC) and the controller 28-2 may be a Central Unit (CU) Control Plane (CP) (CU-CP), and the control interface 30 may be an interface at Layer 3. The first and second communication endpoints 12 as shown also include respective data processors 34-1, 34-2, which may be respective baseband processors. The data processors 34-1, 34-2 may generate data 16 to be communicated over the data interface 14, and may also serialize and/or deserialize that data according to respective formats 22-1, 22-2. The first communication endpoint 12-1 in this context also includes a translator 32 that performs format translation 26 as described above, based on the signaling 24 received over the control interface 30.

More particularly, as shown in FIG. 3B, the controller 28-2 for the second communication endpoint 12-2 sends signaling 24 to the controller 28-1 for the first communication endpoint 12-1 over the control interface 30 (Step 1). The controller 28-2 may for instance send the signaling 24 by making the procedure call sendFormatInfoQ. In some embodiments, as described above, the signaling 24 may be communicated in this way in advance of data communication, e.g., during and/or as part of a procedure for establishing the data interface 14. Upon receiving the signaling 24, the controller 28-1 initiates or otherwise configures the translator 32, e.g., by making the procedure call init( ) as shown (Step 2). Initiation or configuration of the translator 32 may entail generating one or more data structures based on which the format translation 26 is to be performed. In some embodiments, as shown, the controller 28-1 may send the translator 32 information indicating one or both of the respective formats 22-1, 22-2 between which translation is to be performed, and the translator 32 itself generates one or more data structures to be used for format translation 26 (Step 3). In this example, the translator 32 generates one or more data structures in the form of one or more translation tables or other "difference" metadata that describes the difference between the formats 22-1, 22-2.

After the signaling 24 is sent over the control interface 30, FIG. 3C shows that the data processor 34-2 for the second communication endpoint 12-2 transmits serialized data 16S over the data interface 14 to the first communication endpoint 12-1 (Step 4). The translator 32 receives the serialized data 16S for the first communication endpoint 12-1 and uses the one or more data structures previously generated in order to translate the serialized data 16S from format 22-2 to format 22-1 (Step 5). The translator 32 then provides the translated serialized data to the data processor 34-1 for the first communication endpoint 12-1 (Step 6), whereupon the data processor 34-1 processes the serialized data received (Step 7). Processing of the received data may for instance entail deserializing the serialized data 16S according to format 22-1.

The data processor 34-1 may in some embodiments send a reply to the second communication endpoint 12-2 (Step 8). In this case, the data processor 34-1 generates and serializes data for the reply according to format 22-1. The data processor 34-1 provides the serialized data to the translator 32, which translates the serialized data from format 22-1 to format 22-2 (Step 9). The translator 32 then sends the translated serialized data to the second communication endpoint 12-2 (Step 10) so as to provide data that is serialized according to the format 22-2 used by the second communication endpoint 12-2.

Figure 4B:
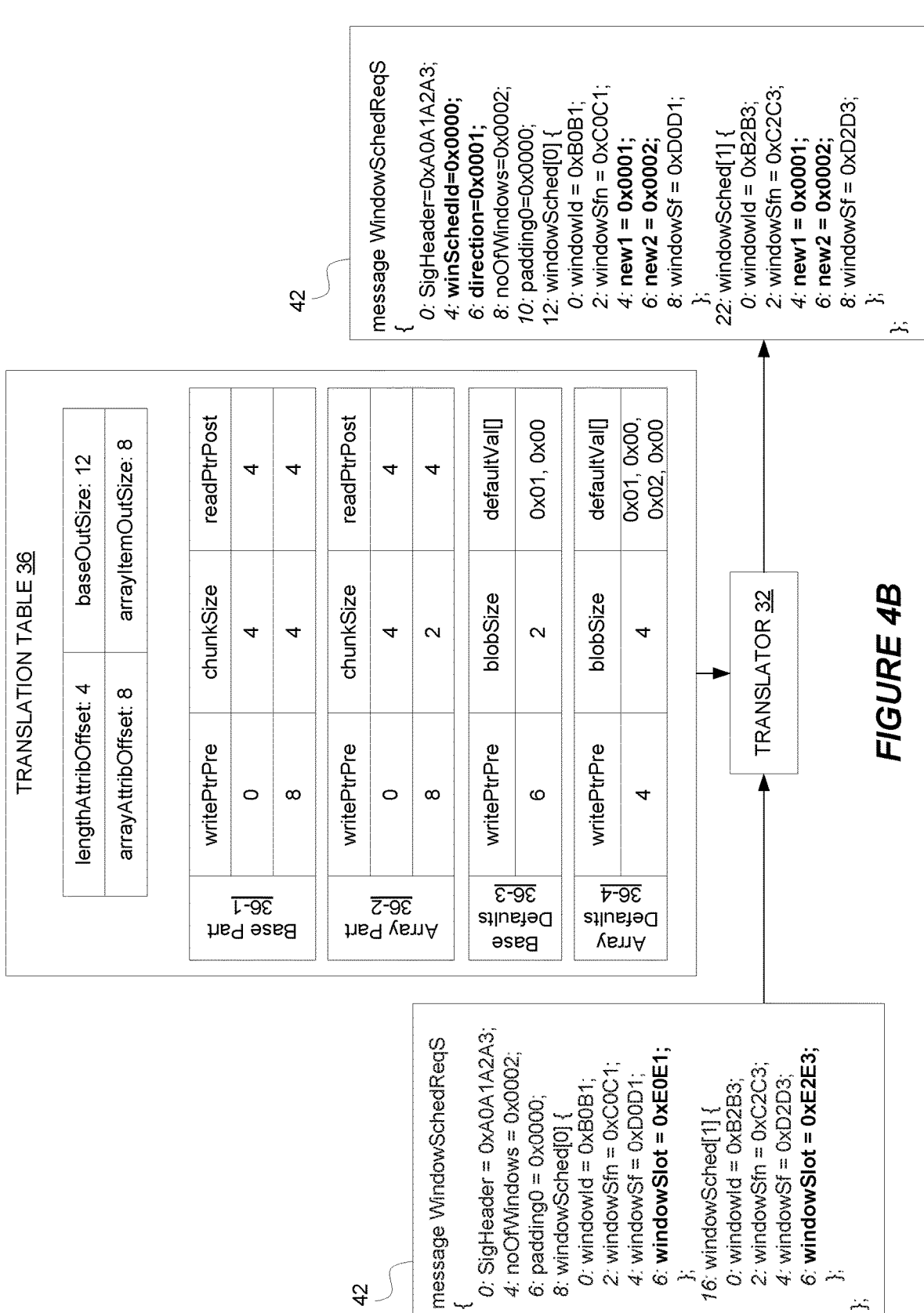
FIG. 4B is a block diagram of format translation using a translation table according to some embodiments.

FIGS. 4A-4B illustrate a concrete example of format translation 26 according to some embodiments. FIG. 4A shows a first format 40-1 according to which the first communication endpoint 12-1 serializes and deserializes a particular type of data message, namely a WindowSchedReqS message that includes an array of a complex data structure. FIG. 4A also shows a second format 40-2 according to which the second communication endpoint 12-2 serializes and deserializes that same type of data message. The first and second formats 40-1, 40-2 differ in a few ways. First, according to the second format 40-2, the WindowSchedReqS message includes the fields winSchedId and direction, whereas the WindowSchedReqS message includes no such fields according to the first format 40-1. Second, the WindowSchedS field includes the new1 and new2 attributes according to the second format 40-2, whereas the WindowSchedS field includes no such attributes according to the first format 40-1. Third, the WindowSchedS field includes the windowSlot attribute according to the first format 40-1, whereas the WindowSchedS field includes no such attribute according to the second format 40-2. Fourth, the direction field is to have a default value of 1, the new1 attribute is to have a default value of 1, and the new2 attribute is to have a default value of 2.

As this example demonstrates, then, the format according to which data is to be serialized and/or deserialized on a message by message basis may be represented using any sort of grammar. Generally, the grammar used for the examples in FIGS. 4A-4B may be extrapolated for any type of message as:

```
<format> → <version info> <struct list> <message list>
<struct list> → <struct list> <struct type>; | ε
<struct type> → struct <name> <struct number>
{ <attribute list> }
<name> → String
<struct number> → Integer
<message list> → <message list> <message>; | ε
<message> → message <name> <message number>
{ <attribute list> }
<attribute list> → <attribute list> <attribute>; | ε
<attribute> → <datatype> <name> <default val> <attrib id>
<array size>
<datatype> → <struct ref> | <scalar type>
<default val> → default=<scalar value> | ε
<attrib id> → Integer
<struct ref> → <name>(<struct number>)
<scalar type> → U32 | S16 . . .
<scalar value> → Number
<array size> → len(<attrib id>)
```

In one such embodiment, the <struct number>s used in each <struct type> must be unique across a <struct list>. And the <message number>s used must be unique for each instance. Note that an Integer is an integer number; Number is an integer, floating-point, or fixed-point number; and String is a sequence of ASCII characters.

FIG. 4B shows a translation table 36 used by the translator 32 to translate the WindowSchedReqS message from the first format 40-1 to the second format 40-2 according to an example. As shown, the translator 32 receives as input a WindowSchedReqS message 42 that is serialized according to the first format 40-1. The translator 32 uses the translation table 36 to translate the WindowSchedReqS message 42 from the first format 40-1 to the second format 40-2. The translation table 36 in this regard indicates read and write operations on a byte-by-byte or chunk-by-chunk basis for translating the WindowSchedReqS message 42 from the first format 40-1 to the second format 40-2. The read and/or write operations may effectively instruct the translator 32 how to read the WindowSchedReqS message 42 that is serialized according to format 40-1 and write into a memory location a corresponding WindowSchedReqS message 42 that is serialized according to format 40-2.

The base part 36-1 of the translation table 36 instructs the translator 32 on how to translate the base part of the input message; that is, the part of the message that has a fixed size. The array part 36-2 of the translation table 36 by contrast instructs the translator 32 on how to translate the flexible array member part of the input message. The base defaults 36-3 in the translation table 36 instructs the translator 32 on what values are to be used by default for attributes in the base part of the translated message whose values are not specified. And the array defaults 36-4 in the translation table 36 instructs the translator 32 on what values are to be used by default for attributes in the flexible array member part of the translated message whose values are not specified.

Each row of the table indicates a certain read and/or write operation, e.g., specifying read and/or write locations in terms of byte or chunk offsets. The "writePtrPre" column indicates by how many bytes the translator 32, prior to performing an operation, is to advance its write pointer for writing the next chunk of the message to be translated. The "chunkSize" column indicates the size of the chunk (in bytes) that the translator 32 is to write from the input message, using the data that starts from the position at which its read pointer points in the input message. And the "readPtrPost" indicates by how many bytes the translator 32 is to advance its read pointer in the input message, after performing the operation.

More particularly, the base part 36-1 of the translation table 36 indicates the translator 32 is to advance its write pointer by 0 bytes in the base part of the message 42 to be written, i.e., the message 42 that is to be serialized according to format 40-2. The translator 32 is then to write a chunk of the first 4 bytes taken from the input message 42. This effectively instructs the translator 32 that the translated message has the same first 4 bytes as the input message, i.e., the SigHeader field is the same according to both formats 40-1, 40-2.

The next row in the base part 36-1 of the translation table 36 shows that the translator 32 is to advance its write pointer by 8 bytes in the message 42 to be written, i.e., to skip bytes 4-7 in the output buffer. The translator 32 is to write a chunk of the next 4 bytes taken from the input message 42. This effectively instructs the translator 32 that bytes 4-7 of the input message are to be written into bytes 8-11 of the translated message, i.e., the noOfWindows field and the padding( ) field from the input message are to be copied into bytes 8-11 of the translated message. The translator 32 is then to advance its read pointer by 4 bytes in the input message.

Note that the flexible array member windowSched is connected to a length attribute (noOfWindows, attribute 2). The translation table 36 is generated based on this knowledge, and the lengthAttribOffset, from the Translation Table header, specifies where in the "input message" the translator 32 can read out the array length. In this example, the array length attribute is always a 16-bit word. In another embodiment, the length type is 32-bits, or even variable and thus specified by a separate field in the translation table header. The translator 32 then needs to iterate the translation over each array element.

The array part 36-2 of the translation table 36 instructs the translator 32 how to translate the flexible array member in the input message. Before accessing the array part 36-2, the write pointer needs to be set to baseOutSize from the Translation Table header, as there may be some new field in the base part of the format 40-2 that should be skipped. According to the array part 36-2, the translator 32 is to advance its write pointer by 0 bytes in the array field to be written in the translated message. The translator 32 is to write a chunk of the first 4 bytes taken from the array field of the input message 42. This effectively instructs the translator 32 to copy the windowId attribute and the windowSfn attribute in bytes 0-3 of the array field in the input message into bytes 0-3 in the translated message. The translator 32 is then instructed to advance its read pointer by 4 bytes in the input message.

The array part 36-2 further instructs that the translator 32 is to advance its write pointer by 8 bytes in the array field to be written in the translated message. The translator 32 is to write a chunk of the first 2 bytes taken from the array field of the input message 42. This effectively instructs the translator 32 to copy the windowSf attribute in bytes 4-5 of the array field in the input message into bytes 8-9 in the translated message. The translator 32 is then instructed to advance its read pointer by 4 bytes in the input message.

The base defaults 36-3 in the translation table 36 next instructs the translator 32 to advance its write pointer, starting from byte 0 of the base part, by 6 bytes. The translator 32 is to write a blob of 2 bytes with a default value of 0x0001. This effectively means the translated message includes a default value of 0x0001 for the direction field in bytes 6-7.

Note here that no default value is provided for winSchedId. This illustrates the case where there is no point in providing a default value, perhaps because the application always needs to fill this in from its context. There is no information provided to explain what the value of winSchedId would be, out from the translator 32. If the translator 32 (or the application) fills the output buffer with zeroes, it would be 0x0000 as currently illustrated. Otherwise, the output would be undefined (i.e., garbage).

The translator 32 needs to read out the array length (at offset lengthAttribOffset) and iterate the default settings over each array element. In this regard, the array defaults 36-4 in the translation table 36 then instructs the translator 32 to advance its write pointer by 4 bytes, starting from byte 0 of the array part whose offset in turn is identified by the baseOutSize field in the Translation Table header. The translator 32 is to write a blob of 4 bytes with values of 0x01 in the first byte, 0x00 in the second byte, 0x02 in the third byte, and 0x00 in the fourth byte. This effectively means the translated message includes a default value of 0x0001 for the new1 attribute in bytes 4-5 of each array element and a default value of 0x0002 for the new2 attribute in bytes 6-7 of each array element, assuming a little Endian processor architecture.

Note that the translation table 36 does not instruct the translator 32 to translate the windowSlot field into the translated message. This is because the WindowSchedReqS message lacks the windowSlot field when the message 42 is serialized according to the second format 40-2. Accordingly, because the translation table 36 lacks read and/or write operations focused on bytes 6-7 of the array, the translation table 36 effectively enables the removal or deletion of a field or attribute from the input message.

The above example illustrates that, in at least some embodiments, format translation is performed on a message by message basis. Indeed, a separate translation table may be generated and used for each different type of message that can be exchanged over the data interface 14.

Note further that the translation table(s) and/or other data structures usable for format translation may be stored persistently in memory at the first communication endpoint 12-1. This persistent storage may mean that the translation table(s) and/or other data structures may be stored across multiple exchanges of serialized data between the endpoints 12 on the data interface 14. For example, the same translation table(s) and/or other data structures used to translate one message may be re-used to translate another message of the same type subsequently transmitted over the data interface 14. Persistent storage may thereby advantageously reduce demands on processing resources at run-time.

Note, too, that once translation has been performed between different formats, there is no overhead in accessing the data. Furthermore, in some embodiments, the data structures and the formatting information may be based upon an interface schema, in which case no manual adaptation code is needed. In fact, in the format translation approach, no code generation is needed.

Additionally, although some embodiments have illustrated format translation 26 as being performed separate from serialization 18-1 and deserialization 20-1, in other embodiments format translation 26 is performed in combination with serialization 18-1 and/or deserialization 20-1. The format translation 26 may for example be effectively embedded within serialization 18-1 and/or deserialization 20-1.

Figure 5:
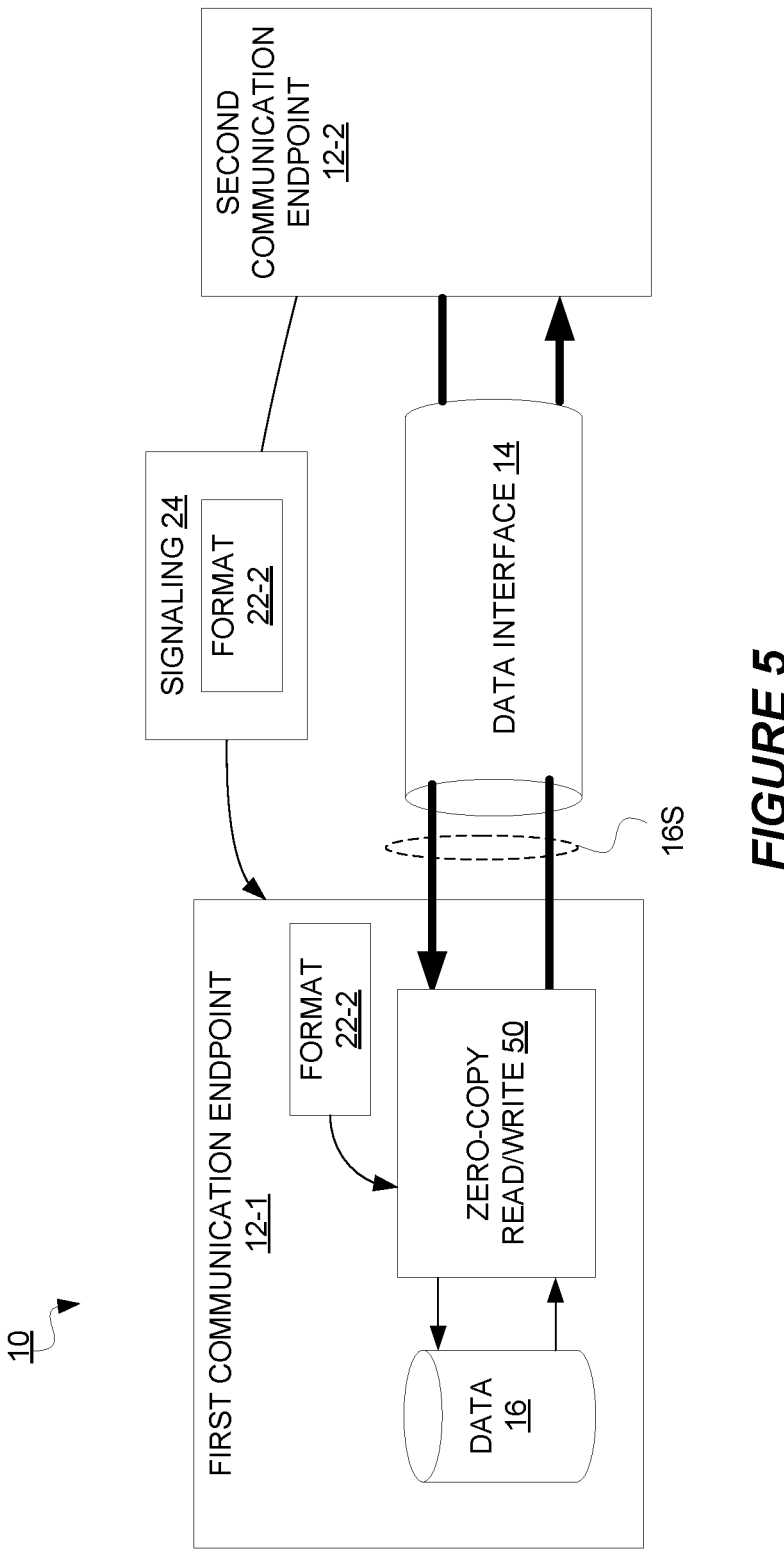
FIG. 5 is a block diagram of a communication network in which a communication endpoint performs zero-copy read/write operations according to some embodiments.

In yet other embodiments, the first communication endpoint 12-1 may generate serialized data to be sent to the second communication endpoint 12-2, and/or process serialized data received from the second communication endpoint 12-2, in other ways in order to accommodate for the second communication endpoint's use of the signaled format 22-2. For example, in a so-called zero-copy approach, the first communication endpoint 12-1 may directly write to its transmit buffer at least a portion of the serialized data 16S to be transmitted, according to the format 22-2 signaled. In some embodiments, for example, this amounts to the first communication endpoint 12-1 effectively serializing the data on a field by field basis, rather than on a message by message basis. Alternatively or additionally, the first communication endpoint 12-1 may directly read at least a portion of the received serialized data 16S from its receive buffer, according to the format 22-2 signaled. In some embodiments, for example, this amounts to the first communication endpoint 12-1 effectively deserializing the data on a field by field basis, rather than on a message by message basis. In these and other embodiments, then, the first communication endpoint 12-1 may exploit the format 22-2 signaled in order to directly and/or selectively extract at least certain portion(s) of the serialized data 16S received, e.g., without copying the serialized data 16S into an intermediate buffer and/or without translating the serialized data into another format. In some embodiments, the zero-copy approach requires the generation of access Application Programming Interfaces (APIs), and a scheme for coupling format information and the data to access in run-time. FIG. 5 shows one example.

As shown in FIG. 5, the first communication endpoint 12-1 receives into its receive buffer serialized data 16S that is serialized according to the format 22-2 signaled. Rather than translating that serialized data 16S in full into another format 22-1 and then deserializing the translated data, the first communication endpoint 12-1 performs zero-copy read operation(s) 50 on the serialized data 16S directly. This means the first communication endpoint 12-1 exploits the signaled format 22-2 in order to directly access and read selected portion(s) of the serialized data 16S, as still formatted according to format 22-2. The first communication endpoint 12-1 in this regard may determine from the signaled format 22-2 an absolute or relative byte location of data desired in the receive buffer. The first communication endpoint 12-1 may then advance its read pointer in the receive buffer to the determined location in order to read the desired data directly into working memory. The first communication endpoint 12-1 may thereby do this without translating all serialized data 16S to an intermediate buffer.

Alternatively or additionally, the first communication endpoint 12-1 may obtain data 16 for sending to the second communication endpoint 12-2. Rather than serializing the data 16 according to one format 22-1 and then translating that serialized data in full into the signaled format 22-2, the first communication endpoint 12-1 performs zero-copy write operation(s) 50 on the data 16 directly. This means the first communication endpoint 12-1 exploits the signaled format 22-2 in order to directly write to a transmit buffer select portion(s) of the serialized data 16S, serialized according to format 22-2. The first communication endpoint 12-1 in this regard may determine from the signaled format 22-2 an absolute or relative byte location of where certain data should be written in the transmit buffer. The first communication endpoint 12-1 may then advance its write pointer in the transmit buffer to the determined location in order to write the certain data directly into the transmit buffer. The first communication endpoint 12-1 may thereby do this without copying the data 16 from application memory to an intermediate buffer.

Regardless, embodiments above have been described from the perspective that the second communication endpoint 12-2 signals the format 22-2 it will use for serialization and/or deserialization, and the first communication endpoint 12-1 exploits that signaling 24 to accommodate the second communication endpoint's use of the indicated format 22-2, e.g., the first communication endpoint 12-1 performs format translation and/or zero-copy operations for data communicated in both directions. In other embodiments, however, the first communication endpoint 12-1 additionally or alternatively signals to the second communication endpoint 12-2 the format 22-1 it will use for serialization and/or deserialization, and the second communication endpoint 12-2 exploits that signaling to accommodate the first communication endpoint's use of the indicated format 22-1. Where both endpoints 12-1 and 12-2 signal this, then, the endpoints 12 effectively exchange signaling regarding the respective formats 22-1, 22-2 they will use for serialization and/or deserialization. In one such embodiment, the first communication endpoint 12-1 performs format translation or zero-copy operations for data communicated in one direction between the endpoints 12, and the second communication endpoint 12-2 performs format translation or zero-copy operations for data communicated in the other direction. In these and other embodiments, then, the second communication endpoint 12-2 may operate in the same way as described above for the first communication endpoint 12-1, for at least some of the data communicated between the endpoints 12.

Note further that although some embodiments have described the endpoints 12 as communicating the signaling 24 in advance of data transmission, the signaling 24 in one or more embodiments may also be communicated during data transmission, e.g., to accommodate format changes at run-time. In this case, the signaling 24 must be re-communicated and any data structure(s) for format translation or zero-copy operations must be re-generated.

Moreover, some embodiments build upon inserting or removing bytes at predefined offsets in a byte stream constituting a data message. In embodiments capable of using the C programming language, a message may be communicated by sending C struct memory buffers directly, and there is no serialization metadata overhead needed. This makes the method become very powerful. These and other embodiments may advocate sending data in messages in a predefined way (however, with support for dynamic arrays) and not include serialization metadata in the messages, e.g., simply sending the memory layout of the messages on the wire.

In view of the modifications and variations herein, FIG. 6 shows a method performed by a first communication endpoint 12-1 in a communication network 10 according to some embodiments, e.g., a radio network node in a radio access network. The method includes receiving, from a second communication endpoint 12-2 in the communication network 10, signaling 24 that indicates a format 22-2 according to which the second communication endpoint 12-2 will serialize and/or deserialize data to be communicated between the first and second communication endpoints 12 (Block 600). In some embodiments, the format 22-2 indicated by the received signaling 24 dictates at least one of any one or more of: (i) into which message types and/or message fields data is structured; (ii) a byte offset, within a byte stream that represents a message, at which each message field is respectively serialized; (iii) an order in which message fields are serialized; and (iv) a default value for at least one message field.

In some embodiments, the signaling 24 is received during a procedure for establishing a data interface 14 over which data is to be communicated between the first communication endpoint 12-1 and the second communication endpoint 12-2. Alternatively or additionally, the signaling 24 may be received over a control plane interface that is different than a data interface 14 over which data is to be communicated between the first communication endpoint 12-1 and the second communication endpoint 12-2. In yet other embodiments, the signaling 24 may alternatively or additionally be received at a layer of a communication protocol stack that is higher than a layer of the communication protocol stack at which serialized data 16S is to be communicated between the first communication endpoint 12-1 and the second communication endpoint 12-2. In still other embodiments, the signaling 24 may be received in a message that is separate from a message in which serialized data is received from the second communication endpoint 12-2.

In some embodiments, the method further comprises generating serialized data 16S to be transmitted to the second communication endpoint 12-2, and/or processing serialized data 16S received from the second communication endpoint 12-2, according to the format 22-2 indicated by the received signaling 24 (Block 610). In one such embodiment where the format 22-2 according to which the second communication endpoint 12-2 serializes and/or deserializes data is a second format, and where the serialized data 16S received from the second communication endpoint 12-2 is serialized according to the second format 22-2, processing the serialized data 16S received from the second communication endpoint 12-2 may comprise translating the received serialized data from the second format 22-2 to a first format 22-1 according to which the first communication endpoint 12-1 serializes and/or deserializes data, or reading at least a portion of the received serialized data 16S from a receive buffer according to the second format 22-2. In another embodiment, where the format 22-2 according to which the second communication endpoint 12-2 serializes and/or deserializes data is a second format, generating serialized data 16S to be transmitted to the second communication endpoint 12-2 may comprise serializing data according to a first format 22-1 and translating the serialized data from the first format 22-1 to the second format 22-2, for transmission to the second communication endpoint 12-2, or writing to a transmit buffer at least a portion of the serialized data to be transmitted, according to the second format 22-2.

In either case, the method may further comprise obtaining, based on the format 22-2 indicated by the received signaling 24, one or more data structures at the first communication endpoint 12-1 for performing such generating and/or such processing (Block 605). In this case, the one or more data structures may be stored persistently in memory across multiple exchanges of serialized data between the first and second communication endpoints 12. For example, the one or more data structures may include one or more translation tables 26 that indicate read and/or write operations on a byte-by-byte or chunk-by-chunk basis for translating serialized data between the format 22-2 indicated by the received signaling 24 and a format 22-1 according to which the first communication endpoint 12-1 serializes and/or deserializes data.

FIG. 7 illustrates a corresponding method performed by a second communication endpoint 12-2 in a communication network 10 according to some embodiments. The method as shown includes transmitting, to a first communication endpoint 12-1 in the communication network 10, signaling 24 that indicates a format 22-2 according to which the second communication endpoint 12-2 will serialize and/or deserialize data to be communicated between the first and second communication endpoints 12 (Block 700). In some embodiments, the format 22-2 indicated by the signaling 24 dictates at least one of any one or more of: (i) into which message types and/or message fields data is structured; (ii) a byte offset, within a byte stream that represents a message, at which each message field is respectively serialized; (iii) an order in which message fields are serialized; and (iv) a default value for at least one message field.

In some embodiments, the signaling 24 is transmitted during a procedure for establishing a data interface 14 over which data is to be communicated between the first communication endpoint 12-1 and the second communication endpoint 12-2. Alternatively or additionally, the signaling 24 may be transmitted over a control plane interface that is different than a data interface 14 over which data is to be communicated between the first communication endpoint 12-1 and the second communication endpoint 12-2. In yet other embodiments, the signaling 24 may alternatively or additionally be transmitted at a layer of a communication protocol stack that is higher than a layer of the communication protocol stack at which serialized data is to be communicated between the first communication endpoint 12-1 and the second communication endpoint 12-2. In still other embodiments, the signaling 24 may be transmitted in a message that is separate from a message in which serialized data is transmitted from the second communication endpoint 12-2.

In some embodiments, the second communication endpoint 12-2 is a radio network node that is split into a centralized unit, CU, and one or more distributed units, DUs, where the signaling 24 that indicates the format is transmitted by the CU to the first communication endpoint 12-1.

In another embodiment, the communication endpoints 12 are processes in the same network node, such that the data interface 14 is an intra-node, inter-process interface. In this latter case, for example, the processes may be processes implemented at respective first and second layers of a protocol stack. In an alternative intra-node embodiment, one or both of the formats 22-1, 22-2 can be retrieved from local storage instead of being signaled with inter-process communication.

In some embodiments, the method further comprises serializing and/or deserializing data according to the indicated format 22-2 (Block 710). In these and other embodiments, the method may also comprise transmitting and/or receiving serialized data that is serialized according to the indicated format 22-2 (Block 720).

Embodiments herein also include corresponding apparatuses. Embodiments herein for instance include a communication endpoint 12 configured to perform any of the steps of any of the embodiments described above for the first communication endpoint 12-1 and/or the second communication endpoint 12-2.

Embodiments also include a communication endpoint 12 comprising processing circuitry and power supply circuitry. The processing circuitry is configured to perform any of the steps of any of the embodiments described above for the first communication endpoint 12-1 and/or the second communication endpoint 12-2. The power supply circuitry is configured to supply power to the communication endpoint 12.

Embodiments further include a communication endpoint 12 comprising processing circuitry. The processing circuitry is configured to perform any of the steps of any of the embodiments described above for the first communication endpoint 12-1 and/or the second communication endpoint 12-2. In some embodiments, the communication endpoint 12 further comprises communication circuitry.

Embodiments further include a communication endpoint 12 comprising processing circuitry and memory. The memory contains instructions executable by the processing circuitry whereby the communication endpoint 12 is configured to perform any of the steps of any of the embodiments described above for the first communication endpoint 12-1 and/or the second communication endpoint 12-2.

More particularly, a communication endpoint 12 described above may perform the methods herein and any other processing by implementing any functional means, modules, units, or circuitry. In one embodiment, for example, the communication endpoint 12 comprises respective circuits or circuitry configured to perform the steps shown in the method figures. The circuits or circuitry in this regard may comprise circuits dedicated to performing certain functional processing and/or one or more microprocessors in conjunction with memory. For instance, the circuitry may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory, cache memory, flash memory devices, optical storage devices, etc. Program code stored in memory may include program instructions for executing one or more telecommunications and/or data communications protocols as well as instructions for carrying out one or more of the techniques described herein, in several embodiments. In embodiments that employ memory, the memory stores program code that, when executed by the one or more processors, carries out the techniques described herein.

Figure 8:
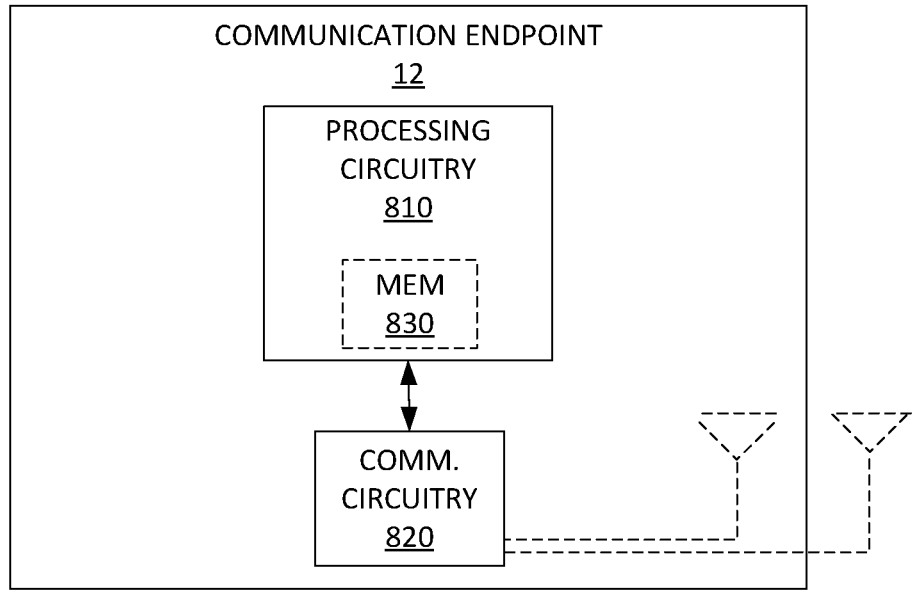
FIG. 8 is a block diagram of a communication endpoint in a communication network according to some embodiments.

FIG. 8 for example illustrates a communication endpoint 12 as implemented in accordance with one or more embodiments, e.g., as the first communication endpoint 12-1 or the second communication endpoint 12-2. As shown, the communication endpoint 12 includes processing circuitry 810 and communication circuitry 820. The communication circuitry 820 is configured to transmit and/or receive information to and/or from one or more other nodes, e.g., via any communication technology. Such communication may occur via one or more antennas that are either internal or external to the communication endpoint 12. Regardless, this communication may involve transmitting and/or receiving the signaling 24 described herein. Alternatively or additionally, the communication may involve transmitting and/or receiving data over the data interface 14 described herein. The processing circuitry 810 is configured to perform processing described above, e.g., in FIG. 6 and/or FIG. 7, such as by executing instructions stored in memory 830. The processing circuitry 810 in this regard may implement certain functional means, units, or modules.

Those skilled in the art will also appreciate that embodiments herein further include corresponding computer programs.

A computer program comprises instructions which, when executed on at least one processor of a communication endpoint 12, cause the communication endpoint 12 to carry out any of the respective processing described above. A computer program in this regard may comprise one or more code modules corresponding to the means or units described above.

Embodiments further include a carrier containing such a computer program. This carrier may comprise one of an electronic signal, optical signal, radio signal, or computer readable storage medium.

In this regard, embodiments herein also include a computer program product stored on a non-transitory computer readable (storage or recording) medium and comprising instructions that, when executed by a processor of a communication endpoint 12, cause the communication endpoint 12 to perform as described above.

Embodiments further include a computer program product comprising program code portions for performing the steps of any of the embodiments herein when the computer program product is executed by a communication endpoint 12. This computer program product may be stored on a computer readable recording medium.

Figure 9:
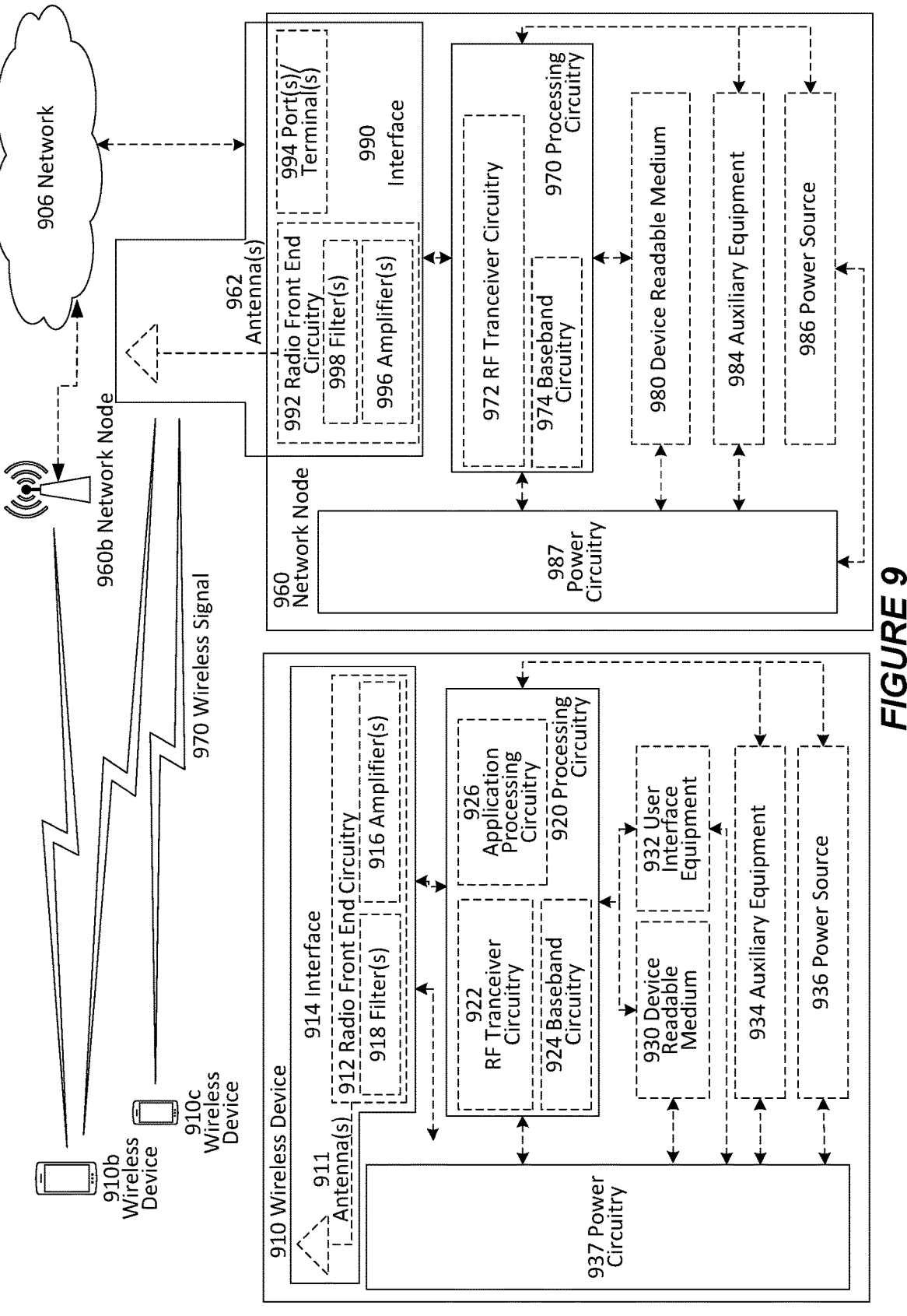
FIG. 9 is a block diagram of a wireless communication network according to some embodiments.

Although the subject matter described herein may be implemented in any appropriate type of system using any suitable components, some embodiments disclosed herein are described in relation to a communication network 10 that takes the form of a wireless network, such as the example wireless network illustrated in FIG. 9. For simplicity, the wireless network of FIG. 9 only depicts network 906, network nodes 960 and 960b, and WDs 910, 910b, and 910c. In practice, a wireless network may further include any additional elements suitable to support communication between wireless devices or between a wireless device and another communication device, such as a landline telephone, a service provider, or any other network node or end device. Of the illustrated components, network node 960 and wireless device (WD) 910 are depicted with additional detail. The wireless network may provide communication and other types of services to one or more wireless devices to facilitate the wireless devices' access to and/or use of the services provided by, or via, the wireless network.

A communication endpoint 12 herein may be or be included in any element shown in FIG. 9, whether in a network node or in a wireless device.

The wireless network may comprise and/or interface with any type of communication, telecommunication, data, cellular, and/or radio network or other similar type of system. In some embodiments, the wireless network may be configured to operate according to specific standards or other types of predefined rules or procedures. Thus, particular embodiments of the wireless network may implement communication standards, such as Global System for Mobile Communications (GSM), Universal Mobile Telecommunications System (UMTS), Long Term Evolution (LTE), Narrowband Internet of Things (NB-IoT), and/or other suitable 2G, 3G, 4G, or 5G standards; wireless local area network (WLAN) standards, such as the IEEE 802.11 standards; and/or any other appropriate wireless communication standard, such as the Worldwide Interoperability for Microwave Access (WiMax), Bluetooth, Z-Wave and/or ZigBee standards.

Network 906 may comprise one or more backhaul networks, core networks, IP networks, public switched telephone networks (PSTNs), packet data networks, optical networks, wide-area networks (WANs), local area networks (LANs), wireless local area networks (WLANs), wired networks, wireless networks, metropolitan area networks, and other networks to enable communication between devices.

Network node 960 and WD 910 comprise various components described in more detail below. These components work together in order to provide network node and/or wireless device functionality, such as providing wireless connections in a wireless network. In different embodiments, the wireless network may comprise any number of wired or wireless networks, network nodes, base stations, controllers, wireless devices, relay stations, and/or any other components or systems that may facilitate or participate in the communication of data and/or signals whether via wired or wireless connections.

As used herein, network node refers to equipment capable, configured, arranged and/or operable to communicate directly or indirectly with a wireless device and/or with other network nodes or equipment in the wireless network to enable and/or provide wireless access to the wireless device and/or to perform other functions (e.g., administration) in the wireless network. Examples of network nodes include, but are not limited to, access points (APs) (e.g., radio access points), base stations (BSs) (e.g., radio base stations, Node Bs, evolved Node Bs (eNBs) and NR NodeBs (gNBs)). Base stations may be categorized based on the amount of coverage they provide (or, stated differently, their transmit power level) and may then also be referred to as femto base stations, pico base stations, micro base stations, or macro base stations. A base station may be a relay node or a relay donor node controlling a relay. A network node may also include one or more (or all) parts of a distributed radio base station such as centralized digital units and/or remote radio units (RRUs), sometimes referred to as Remote Radio Heads (RRHs). Such remote radio units may or may not be integrated with an antenna as an antenna integrated radio. Parts of a distributed radio base station may also be referred to as nodes in a distributed antenna system (DAS). Yet further examples of network nodes include multi-standard radio (MSR) equipment such as MSR BSs, network controllers such as radio network controllers (RNCs) or base station controllers (BSCs), base transceiver stations (BTSs), transmission points, transmission nodes, multi-cell/multicast coordination entities (MCEs), core network nodes (e.g., MSCs, MMEs), O&M nodes, OSS nodes, SON nodes, positioning nodes (e.g., E-SMLCs), and/or MDTs. As another example, a network node may be a virtual network node as described in more detail below. More generally, however, network nodes may represent any suitable device (or group of devices) capable, configured, arranged, and/or operable to enable and/or provide a wireless device with access to the wireless network or to provide some service to a wireless device that has accessed the wireless network.

In FIG. 9, network node 960 includes processing circuitry 970, device readable medium 980, interface 990, auxiliary equipment 984, power source 986, power circuitry 987, and antenna 962. Although network node 960 illustrated in the example wireless network of FIG. 9 may represent a device that includes the illustrated combination of hardware components, other embodiments may comprise network nodes with different combinations of components. It is to be understood that a network node comprises any suitable combination of hardware and/or software needed to perform the tasks, features, functions and methods disclosed herein. Moreover, while the components of network node 960 are depicted as single boxes located within a larger box, or nested within multiple boxes, in practice, a network node may comprise multiple different physical components that make up a single illustrated component (e.g., device readable medium 980 may comprise multiple separate hard drives as well as multiple RAM modules).

Similarly, network node 960 may be composed of multiple physically separate components (e.g., a NodeB component and an RNC component, or a BTS component and a BSC component, etc.), which may each have their own respective components. In certain scenarios in which network node 960 comprises multiple separate components (e.g., BTS and BSC components), one or more of the separate components may be shared among several network nodes. For example, a single RNC may control multiple NodeB's. In such a scenario, each unique NodeB and RNC pair, may in some instances be considered a single separate network node. In some embodiments, network node 960 may be configured to support multiple radio access technologies (RATs). In such embodiments, some components may be duplicated (e.g., separate device readable medium 980 for the different RATs) and some components may be reused (e.g., the same antenna 962 may be shared by the RATs). Network node 960 may also include multiple sets of the various illustrated components for different wireless technologies integrated into network node 960, such as, for example, GSM, WCDMA, LTE, NR, WiFi, or Bluetooth wireless technologies. These wireless technologies may be integrated into the same or different chip or set of chips and other components within network node 960.

Processing circuitry 970 is configured to perform any determining, calculating, or similar operations (e.g., certain obtaining operations) described herein as being provided by a network node. These operations performed by processing circuitry 970 may include processing information obtained by processing circuitry 970 by, for example, converting the obtained information into other information, comparing the obtained information or converted information to information stored in the network node, and/or performing one or more operations based on the obtained information or converted information, and as a result of said processing making a determination.

Processing circuitry 970 may comprise a combination of one or more of a microprocessor, controller, microcontroller, central processing unit, digital signal processor, application-specific integrated circuit, field programmable gate array, or any other suitable computing device, resource, or combination of hardware, software and/or encoded logic operable to provide, either alone or in conjunction with other network node 960 components, such as device readable medium 980, network node 960 functionality. For example, processing circuitry 970 may execute instructions stored in device readable medium 980 or in memory within processing circuitry 970. Such functionality may include providing any of the various wireless features, functions, or benefits discussed herein. In some embodiments, processing circuitry 970 may include a system on a chip (SOC).

In some embodiments, processing circuitry 970 may include one or more of radio frequency (RF) transceiver circuitry 972 and baseband processing circuitry 974. In some embodiments, radio frequency (RF) transceiver circuitry 972 and baseband processing circuitry 974 may be on separate chips (or sets of chips), boards, or units, such as radio units and digital units. In alternative embodiments, part or all of RF transceiver circuitry 972 and baseband processing circuitry 974 may be on the same chip or set of chips, boards, or units In certain embodiments, some or all of the functionality described herein as being provided by a network node, base station, eNB or other such network device may be performed by processing circuitry 970 executing instructions stored on device readable medium 980 or memory within processing circuitry 970. In alternative embodiments, some or all of the functionality may be provided by processing circuitry 970 without executing instructions stored on a separate or discrete device readable medium, such as in a hard-wired manner. In any of those embodiments, whether executing instructions stored on a device readable storage medium or not, processing circuitry 970 can be configured to perform the described functionality. The benefits provided by such functionality are not limited to processing circuitry 970 alone or to other components of network node 960, but are enjoyed by network node 960 as a whole, and/or by end users and the wireless network generally.

Device readable medium 980 may comprise any form of volatile or non-volatile computer readable memory including, without limitation, persistent storage, solid-state memory, remotely mounted memory, magnetic media, optical media, random access memory (RAM), read-only memory (ROM), mass storage media (for example, a hard disk), removable storage media (for example, a flash drive, a Compact Disk (CD) or a Digital Video Disk (DVD)), and/or any other volatile or non-volatile, non-transitory device readable and/or computer-executable memory devices that store information, data, and/or instructions that may be used by processing circuitry 970. Device readable medium 980 may store any suitable instructions, data or information, including a computer program, software, an application including one or more of logic, rules, code, tables, etc. and/or other instructions capable of being executed by processing circuitry 970 and, utilized by network node 960. Device readable medium 980 may be used to store any calculations made by processing circuitry 970 and/or any data received via interface 990. In some embodiments, processing circuitry 970 and device readable medium 980 may be considered to be integrated.

Interface 990 is used in the wired or wireless communication of signalling and/or data between network node 960, network 906, and/or WDs 910. As illustrated, interface 990 comprises port(s)/terminal(s) 994 to send and receive data, for example to and from network 906 over a wired connection. Interface 990 also includes radio front end circuitry 992 that may be coupled to, or in certain embodiments a part of, antenna 962. Radio front end circuitry 992 comprises filters 998 and amplifiers 996. Radio front end circuitry 992 may be connected to antenna 962 and processing circuitry 970. Radio front end circuitry may be configured to condition signals communicated between antenna 962 and processing circuitry 970. Radio front end circuitry 992 may receive digital data that is to be sent out to other network nodes or WDs via a wireless connection. Radio front end circuitry 992 may convert the digital data into a radio signal having the appropriate channel and bandwidth parameters using a combination of filters 998 and/or amplifiers 996. The radio signal may then be transmitted via antenna 962. Similarly, when receiving data, antenna 962 may collect radio signals which are then converted into digital data by radio front end circuitry 992. The digital data may be passed to processing circuitry 970. In other embodiments, the interface may comprise different components and/or different combinations of components.

In certain alternative embodiments, network node 960 may not include separate radio front end circuitry 992, instead, processing circuitry 970 may comprise radio front end circuitry and may be connected to antenna 962 without separate radio front end circuitry 992. Similarly, in some embodiments, all or some of RF transceiver circuitry 972 may be considered a part of interface 990. In still other embodiments, interface 990 may include one or more ports or terminals 994, radio front end circuitry 992, and RF transceiver circuitry 972, as part of a radio unit (not shown), and interface 990 may communicate with baseband processing circuitry 974, which is part of a digital unit (not shown).

Antenna 962 may include one or more antennas, or antenna arrays, configured to send and/or receive wireless signals. Antenna 962 may be coupled to radio front end circuitry 990 and may be any type of antenna capable of transmitting and receiving data and/or signals wirelessly. In some embodiments, antenna 962 may comprise one or more omni-directional, sector or panel antennas operable to transmit/receive radio signals between, for example, 2 GHz and 66 GHz. An omni-directional antenna may be used to transmit/receive radio signals in any direction, a sector antenna may be used to transmit/receive radio signals from devices within a particular area, and a panel antenna may be a line of sight antenna used to transmit/receive radio signals in a relatively straight line. In some instances, the use of more than one antenna may be referred to as MIMO. In certain embodiments, antenna 962 may be separate from network node 960 and may be connectable to network node 960 through an interface or port.

Antenna 962, interface 990, and/or processing circuitry 970 may be configured to perform any receiving operations and/or certain obtaining operations described herein as being performed by a network node. Any information, data and/or signals may be received from a wireless device, another network node and/or any other network equipment. Similarly, antenna 962, interface 990, and/or processing circuitry 970 may be configured to perform any transmitting operations described herein as being performed by a network node. Any information, data and/or signals may be transmitted to a wireless device, another network node and/or any other network equipment.

Power circuitry 987 may comprise, or be coupled to, power management circuitry and is configured to supply the components of network node 960 with power for performing the functionality described herein. Power circuitry 987 may receive power from power source 986. Power source 986 and/or power circuitry 987 may be configured to provide power to the various components of network node 960 in a form suitable for the respective components (e.g., at a voltage and current level needed for each respective component). Power source 986 may either be included in, or external to, power circuitry 987 and/or network node 960. For example, network node 960 may be connectable to an external power source (e.g., an electricity outlet) via an input circuitry or interface such as an electrical cable, whereby the external power source supplies power to power circuitry 987. As a further example, power source 986 may comprise a source of power in the form of a battery or battery pack which is connected to, or integrated in, power circuitry 987. The battery may provide backup power should the external power source fail. Other types of power sources, such as photovoltaic devices, may also be used.

Alternative embodiments of network node 960 may include additional components beyond those shown in FIG. 9 that may be responsible for providing certain aspects of the network node's functionality, including any of the functionality described herein and/or any functionality necessary to support the subject matter described herein. For example, network node 960 may include user interface equipment to allow input of information into network node 960 and to allow output of information from network node 960. This may allow a user to perform diagnostic, maintenance, repair, and other administrative functions for network node 960.

As used herein, wireless device (WD) refers to a device capable, configured, arranged and/or operable to communicate wirelessly with network nodes and/or other wireless devices. Unless otherwise noted, the term WD may be used interchangeably herein with user equipment (UE). Communicating wirelessly may involve transmitting and/or receiving wireless signals using electromagnetic waves, radio waves, infrared waves, and/or other types of signals suitable for conveying information through air. In some embodiments, a WD may be configured to transmit and/or receive information without direct human interaction. For instance, a WD may be designed to transmit information to a network on a predetermined schedule, when triggered by an internal or external event, or in response to requests from the network. Examples of a WD include, but are not limited to, a smart phone, a mobile phone, a cell phone, a voice over IP (Vol P) phone, a wireless local loop phone, a desktop computer, a personal digital assistant (PDA), a wireless cameras, a gaming console or device, a music storage device, a playback appliance, a wearable terminal device, a wireless endpoint, a mobile station, a tablet, a laptop, a laptop-embedded equipment (LEE), a laptop-mounted equipment (LME), a smart device, a wireless customer-premise equipment (CPE). a vehicle-mounted wireless terminal device, etc. A WD may support device-to-device (D2D) communication, for example by implementing a 3GPP standard for sidelink communication, vehicle-to-vehicle (V2V), vehicle-to-infrastructure (V2I), vehicle-to-everything (V2X) and may in this case be referred to as a D2D communication device. As yet another specific example, in an Internet of Things (IoT) scenario, a WD may represent a machine or other device that performs monitoring and/or measurements, and transmits the results of such monitoring and/or measurements to another WD and/or a network node. The WD may in this case be a machine-to-machine (M2M) device, which may in a 3GPP context be referred to as an MTC device. As one particular example, the WD may be a UE implementing the 3GPP narrow band internet of things (NB-IoT) standard. Particular examples of such machines or devices are sensors, metering devices such as power meters, industrial machinery, or home or personal appliances (e.g. refrigerators, televisions, etc.) personal wearables (e.g., watches, fitness trackers, etc.). In other scenarios, a WD may represent a vehicle or other equipment that is capable of monitoring and/or reporting on its operational status or other functions associated with its operation. A WD as described above may represent the endpoint of a wireless connection, in which case the device may be referred to as a wireless terminal. Furthermore, a WD as described above may be mobile, in which case it may also be referred to as a mobile device or a mobile terminal.

As illustrated, wireless device 910 includes antenna 911, interface 914, processing circuitry 920, device readable medium 930, user interface equipment 932, auxiliary equipment 934, power source 936 and power circuitry 937. WD 910 may include multiple sets of one or more of the illustrated components for different wireless technologies supported by WD 910, such as, for example, GSM, WCDMA, LTE, NR, WiFi, WiMAX, NB-IoT, or Bluetooth wireless technologies, just to mention a few. These wireless technologies may be integrated into the same or different chips or set of chips as other components within WD 910.

Antenna 911 may include one or more antennas or antenna arrays, configured to send and/or receive wireless signals, and is connected to interface 914. In certain alternative embodiments, antenna 911 may be separate from WD 910 and be connectable to WD 910 through an interface or port. Antenna 911, interface 914, and/or processing circuitry 920 may be configured to perform any receiving or transmitting operations described herein as being performed by a WD. Any information, data and/or signals may be received from a network node and/or another WD. In some embodiments, radio front end circuitry and/or antenna 911 may be considered an interface.

As illustrated, interface 914 comprises radio front end circuitry 912 and antenna 911. Radio front end circuitry 912 comprise one or more filters 918 and amplifiers 916. Radio front end circuitry 914 is connected to antenna 911 and processing circuitry 920, and is configured to condition signals communicated between antenna 911 and processing circuitry 920. Radio front end circuitry 912 may be coupled to or a part of antenna 911. In some embodiments, WD 910 may not include separate radio front end circuitry 912; rather, processing circuitry 920 may comprise radio front end circuitry and may be connected to antenna 911. Similarly, in some embodiments, some or all of RF transceiver circuitry 922 may be considered a part of interface 914. Radio front end circuitry 912 may receive digital data that is to be sent out to other network nodes or WDs via a wireless connection. Radio front end circuitry 912 may convert the digital data into a radio signal having the appropriate channel and bandwidth parameters using a combination of filters 918 and/or amplifiers 916. The radio signal may then be transmitted via antenna 911. Similarly, when receiving data, antenna 911 may collect radio signals which are then converted into digital data by radio front end circuitry 912. The digital data may be passed to processing circuitry 920. In other embodiments, the interface may comprise different components and/or different combinations of components.

Processing circuitry 920 may comprise a combination of one or more of a microprocessor, controller, microcontroller, central processing unit, digital signal processor, application-specific integrated circuit, field programmable gate array, or any other suitable computing device, resource, or combination of hardware, software, and/or encoded logic operable to provide, either alone or in conjunction with other WD 910 components, such as device readable medium 930, WD 910 functionality. Such functionality may include providing any of the various wireless features or benefits discussed herein. For example, processing circuitry 920 may execute instructions stored in device readable medium 930 or in memory within processing circuitry 920 to provide the functionality disclosed herein.

As illustrated, processing circuitry 920 includes one or more of RF transceiver circuitry 922, baseband processing circuitry 924, and application processing circuitry 926. In other embodiments, the processing circuitry may comprise different components and/or different combinations of components. In certain embodiments processing circuitry 920 of WD 910 may comprise a SOC. In some embodiments, RF transceiver circuitry 922, baseband processing circuitry 924, and application processing circuitry 926 may be on separate chips or sets of chips. In alternative embodiments, part or all of baseband processing circuitry 924 and application processing circuitry 926 may be combined into one chip or set of chips, and RF transceiver circuitry 922 may be on a separate chip or set of chips. In still alternative embodiments, part or all of RF transceiver circuitry 922 and baseband processing circuitry 924 may be on the same chip or set of chips, and application processing circuitry 926 may be on a separate chip or set of chips. In yet other alternative embodiments, part or all of RF transceiver circuitry 922, baseband processing circuitry 924, and application processing circuitry 926 may be combined in the same chip or set of chips. In some embodiments, RF transceiver circuitry 922 may be a part of interface 914. RF transceiver circuitry 922 may condition RF signals for processing circuitry 920.

In certain embodiments, some or all of the functionality described herein as being performed by a WD may be provided by processing circuitry 920 executing instructions stored on device readable medium 930, which in certain embodiments may be a computer-readable storage medium. In alternative embodiments, some or all of the functionality may be provided by processing circuitry 920 without executing instructions stored on a separate or discrete device readable storage medium, such as in a hard-wired manner. In any of those particular embodiments, whether executing instructions stored on a device readable storage medium or not, processing circuitry 920 can be configured to perform the described functionality. The benefits provided by such functionality are not limited to processing circuitry 920 alone or to other components of WD 910, but are enjoyed by WD 910 as a whole, and/or by end users and the wireless network generally.

Processing circuitry 920 may be configured to perform any determining, calculating, or similar operations (e.g., certain obtaining operations) described herein as being performed by a WD. These operations, as performed by processing circuitry 920, may include processing information obtained by processing circuitry 920 by, for example, converting the obtained information into other information, comparing the obtained information or converted information to information stored by WD 910, and/or performing one or more operations based on the obtained information or converted information, and as a result of said processing making a determination.

Device readable medium 930 may be operable to store a computer program, software, an application including one or more of logic, rules, code, tables, etc. and/or other instructions capable of being executed by processing circuitry 920. Device readable medium 930 may include computer memory (e.g., Random Access Memory (RAM) or Read Only Memory (ROM)), mass storage media (e.g., a hard disk), removable storage media (e.g., a Compact Disk (CD) or a Digital Video Disk (DVD)), and/or any other volatile or non-volatile, non-transitory device readable and/or computer executable memory devices that store information, data, and/or instructions that may be used by processing circuitry 920. In some embodiments, processing circuitry 920 and device readable medium 930 may be considered to be integrated.

User interface equipment 932 may provide components that allow for a human user to interact with WD 910. Such interaction may be of many forms, such as visual, audial, tactile, etc. User interface equipment 932 may be operable to produce output to the user and to allow the user to provide input to WD 910. The type of interaction may vary depending on the type of user interface equipment 932 installed in WD 910. For example, if WD 910 is a smart phone, the interaction may be via a touch screen; if WD 910 is a smart meter, the interaction may be through a screen that provides usage (e.g., the number of gallons used) or a speaker that provides an audible alert (e.g., if smoke is detected). User interface equipment 932 may include input interfaces, devices and circuits, and output interfaces, devices and circuits. User interface equipment 932 is configured to allow input of information into WD 910, and is connected to processing circuitry 920 to allow processing circuitry 920 to process the input information. User interface equipment 932 may include, for example, a microphone, a proximity or other sensor, keys/buttons, a touch display, one or more cameras, a USB port, or other input circuitry. User interface equipment 932 is also configured to allow output of information from WD 910, and to allow processing circuitry 920 to output information from WD 910. User interface equipment 932 may include, for example, a speaker, a display, vibrating circuitry, a USB port, a headphone interface, or other output circuitry. Using one or more input and output interfaces, devices, and circuits, of user interface equipment 932, WD 910 may communicate with end users and/or the wireless network, and allow them to benefit from the functionality described herein.

Auxiliary equipment 934 is operable to provide more specific functionality which may not be generally performed by WDs. This may comprise specialized sensors for doing measurements for various purposes, interfaces for additional types of communication such as wired communications etc. The inclusion and type of components of auxiliary equipment 934 may vary depending on the embodiment and/or scenario.

Power source 936 may, in some embodiments, be in the form of a battery or battery pack. Other types of power sources, such as an external power source (e.g., an electricity outlet), photovoltaic devices or power cells, may also be used. WD 910 may further comprise power circuitry 937 for delivering power from power source 936 to the various parts of WD 910 which need power from power source 936 to carry out any functionality described or indicated herein. Power circuitry 937 may in certain embodiments comprise power management circuitry. Power circuitry 937 may additionally or alternatively be operable to receive power from an external power source; in which case WD 910 may be connectable to the external power source (such as an electricity outlet) via input circuitry or an interface such as an electrical power cable. Power circuitry 937 may also in certain embodiments be operable to deliver power from an external power source to power source 936. This may be, for example, for the charging of power source 936. Power circuitry 937 may perform any formatting, converting, or other modification to the power from power source 936 to make the power suitable for the respective components of WD 910 to which power is supplied.

Figure 10:
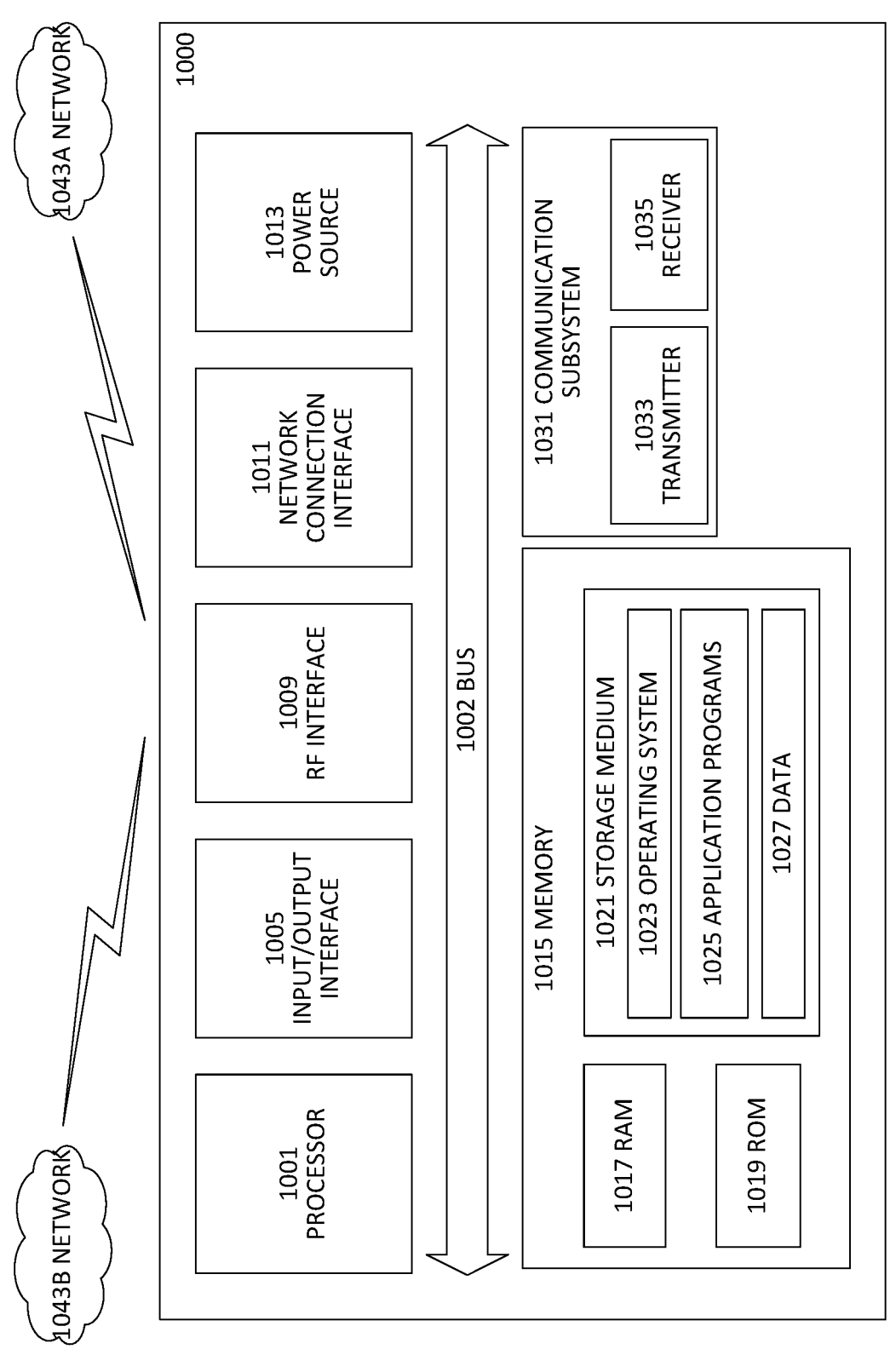
FIG. 10 is a block diagram of a user equipment according to some embodiments.

FIG. 10 illustrates one embodiment of a UE in accordance with various aspects described herein. As used herein, a user equipment or UE may not necessarily have a user in the sense of a human user who owns and/or operates the relevant device. Instead, a UE may represent a device that is intended for sale to, or operation by, a human user but which may not, or which may not initially, be associated with a specific human user (e.g., a smart sprinkler controller). Alternatively, a UE may represent a device that is not intended for sale to, or operation by, an end user but which may be associated with or operated for the benefit of a user (e.g., a smart power meter). UE 10200 may be any UE identified by the 3rd Generation Partnership Project (3GPP), including a NB-IoT UE, a machine type communication (MTC) UE, and/or an enhanced MTC (eMTC) UE. UE 1000, as illustrated in FIG. 10, is one example of a WD configured for communication in accordance with one or more communication standards promulgated by the 3rd Generation Partnership Project (3GPP), such as 3GPP's GSM, UMTS, LTE, and/or 5G standards. As mentioned previously, the term WD and UE may be used interchangeable. Accordingly, although FIG. 10 is a UE, the components discussed herein are equally applicable to a WD, and vice-versa.

In FIG. 10, UE 1000 includes processing circuitry 1001 that is operatively coupled to input/output interface 1005, radio frequency (RF) interface 1009, network connection interface 1011, memory 1015 including random access memory (RAM) 1017, read-only memory (ROM) 1019, and storage medium 1021 or the like, communication subsystem 1031, power source 1033, and/or any other component, or any combination thereof. Storage medium 1021 includes operating system 1023, application program 1025, and data 1027. In other embodiments, storage medium 1021 may include other similar types of information. Certain UEs may utilize all of the components shown in FIG. 10, or only a subset of the components. The level of integration between the components may vary from one UE to another UE. Further, certain UEs may contain multiple instances of a component, such as multiple processors, memories, transceivers, transmitters, receivers, etc.

In FIG. 10, processing circuitry 1001 may be configured to process computer instructions and data. Processing circuitry 1001 may be configured to implement any sequential state machine operative to execute machine instructions stored as machine-readable computer programs in the memory, such as one or more hardware-implemented state machines (e.g., in discrete logic, FPGA, ASIC, etc.); programmable logic together with appropriate firmware; one or more stored program, general-purpose processors, such as a microprocessor or Digital Signal Processor (DSP), together with appropriate software; or any combination of the above. For example, the processing circuitry 1001 may include two central processing units (CPUs). Data may be information in a form suitable for use by a computer.

In the depicted embodiment, input/output interface 1005 may be configured to provide a communication interface to an input device, output device, or input and output device. UE 1000 may be configured to use an output device via input/output interface 1005. An output device may use the same type of interface port as an input device. For example, a USB port may be used to provide input to and output from UE 1000. The output device may be a speaker, a sound card, a video card, a display, a monitor, a printer, an actuator, an emitter, a smartcard, another output device, or any combination thereof. UE 1000 may be configured to use an input device via input/output interface 1005 to allow a user to capture information into UE 1000. The input device may include a touch-sensitive or presence-sensitive display, a camera (e.g., a digital camera, a digital video camera, a web camera, etc.), a microphone, a sensor, a mouse, a trackball, a directional pad, a trackpad, a scroll wheel, a smartcard, and the like. The presence-sensitive display may include a capacitive or resistive touch sensor to sense input from a user. A sensor may be, for instance, an accelerometer, a gyroscope, a tilt sensor, a force sensor, a magnetometer, an optical sensor, a proximity sensor, another like sensor, or any combination thereof. For example, the input device may be an accelerometer, a magnetometer, a digital camera, a microphone, and an optical sensor.

In FIG. 10, RF interface 1009 may be configured to provide a communication interface to RF components such as a transmitter, a receiver, and an antenna. Network connection interface 1011 may be configured to provide a communication interface to network 1043a. Network 1043a may encompass wired and/or wireless networks such as a local-area network (LAN), a wide-area network (WAN), a computer network, a wireless network, a telecommunications network, another like network or any combination thereof. For example, network 1043a may comprise a Wi-Fi network. Network connection interface 1011 may be configured to include a receiver and a transmitter interface used to communicate with one or more other devices over a communication network according to one or more communication protocols, such as Ethernet, TCP/IP, SONET, ATM, or the like. Network connection interface 1011 may implement receiver and transmitter functionality appropriate to the communication network links (e.g., optical, electrical, and the like). The transmitter and receiver functions may share circuit components, software or firmware, or alternatively may be implemented separately.

RAM 1017 may be configured to interface via bus 1002 to processing circuitry 1001 to provide storage or caching of data or computer instructions during the execution of software programs such as the operating system, application programs, and device drivers. ROM 1019 may be configured to provide computer instructions or data to processing circuitry 1001. For example, ROM 1019 may be configured to store invariant low-level system code or data for basic system functions such as basic input and output (I/O), startup, or reception of keystrokes from a keyboard that are stored in a non-volatile memory. Storage medium 1021 may be configured to include memory such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, or flash drives. In one example, storage medium 1021 may be configured to include operating system 1023, application program 1025 such as a web browser application, a widget or gadget engine or another application, and data file 1027. Storage medium 1021 may store, for use by UE 1000, any of a variety of various operating systems or combinations of operating systems.

Storage medium 1021 may be configured to include a number of physical drive units, such as redundant array of independent disks (RAID), floppy disk drive, flash memory, USB flash drive, external hard disk drive, thumb drive, pen drive, key drive, high-density digital versatile disc (HD-DVD) optical disc drive, internal hard disk drive, Blu-Ray optical disc drive, holographic digital data storage (HDDS) optical disc drive, external mini-dual in-line memory module (DIMM), synchronous dynamic random access memory (SDRAM), external micro-DIMM SDRAM, smartcard memory such as a subscriber identity module or a removable user identity (SIM/RUIM) module, other memory, or any combination thereof. Storage medium 1021 may allow UE 1000 to access computer-executable instructions, application programs or the like, stored on transitory or non-transitory memory media, to off-load data, or to upload data. An article of manufacture, such as one utilizing a communication system may be tangibly embodied in storage medium 1021, which may comprise a device readable medium.

In FIG. 10, processing circuitry 1001 may be configured to communicate with network 1043*b* using communication subsystem 1031. Network 1043*a* and network 1043*b* may be the same network or networks or different network or networks. Communication subsystem 1031 may be configured to include one or more transceivers used to communicate with network 1043*b*. For example, communication subsystem 1031 may be configured to include one or more transceivers used to communicate with one or more remote transceivers of another device capable of wireless communication such as another WD, UE, or base station of a radio access network (RAN) according to one or more communication protocols, such as IEEE 802.11, CDMA, WCDMA, GSM, LTE, UTRAN, WiMax, or the like. Each transceiver may include transmitter 1033 and/or receiver 1035 to implement transmitter or receiver functionality, respectively, appropriate to the RAN links (e.g., frequency allocations and the like). Further, transmitter 1033 and receiver 1035 of each transceiver may share circuit components, software or firmware, or alternatively may be implemented separately.

In the illustrated embodiment, the communication functions of communication subsystem 1031 may include data communication, voice communication, multimedia communication, short-range communications such as Bluetooth, near-field communication, location-based communication such as the use of the global positioning system (GPS) to determine a location, another like communication function, or any combination thereof. For example, communication subsystem 1031 may include cellular communication, Wi-Fi communication, Bluetooth communication, and GPS communication. Network 1043*b* may encompass wired and/or wireless networks such as a local-area network (LAN), a wide-area network (WAN), a computer network, a wireless network, a telecommunications network, another like network or any combination thereof. For example, network 1043*b* may be a cellular network, a Wi-Fi network, and/or a near-field network. Power source 1013 may be configured to provide alternating current (AC) or direct current (DC) power to components of UE 1000.

The features, benefits and/or functions described herein may be implemented in one of the components of UE 1000 or partitioned across multiple components of UE 1000. Further, the features, benefits, and/or functions described herein may be implemented in any combination of hardware, software or firmware. In one example, communication subsystem 1031 may be configured to include any of the components described herein. Further, processing circuitry 1001 may be configured to communicate with any of such components over bus 1002. In another example, any of such components may be represented by program instructions stored in memory that when executed by processing circuitry 1001 perform the corresponding functions described herein. In another example, the functionality of any of such components may be partitioned between processing circuitry 1001 and communication subsystem 1031. In another example, the non-computationally intensive functions of any of such components may be implemented in software or firmware and the computationally intensive functions may be implemented in hardware.

Figure 11:
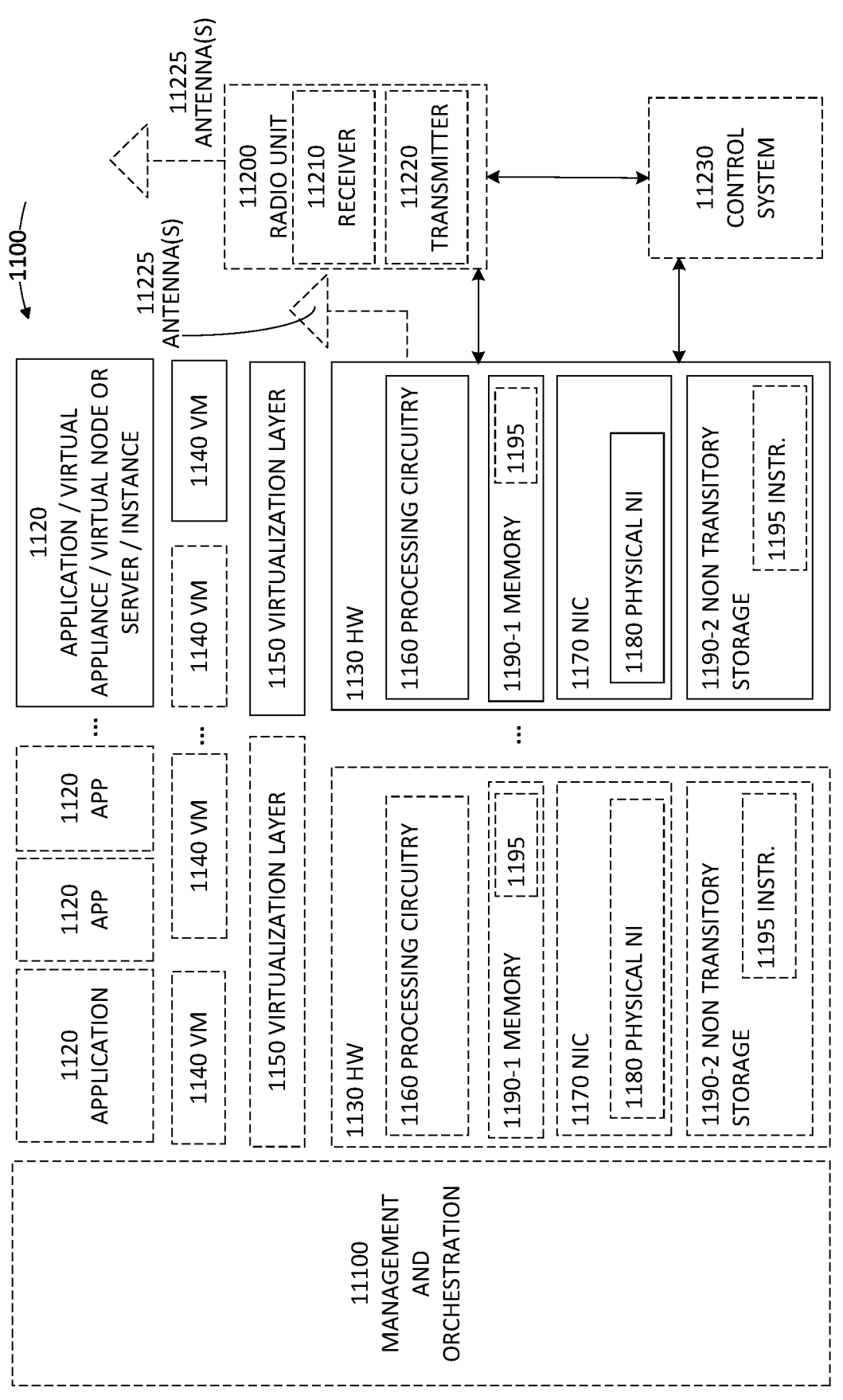
FIG. 11 is a block diagram of a virtualization environment according to some embodiments.

FIG. 11 is a schematic block diagram illustrating a virtualization environment 1100 in which functions implemented by some embodiments may be virtualized. In the present context, virtualizing means creating virtual versions of apparatuses or devices which may include virtualizing hardware platforms, storage devices and networking resources. As used herein, virtualization can be applied to a node (e.g., a virtualized base station or a virtualized radio access node) or to a device (e.g., a UE, a wireless device or any other type of communication device) or components thereof and relates to an implementation in which at least a portion of the functionality is implemented as one or more virtual components (e.g., via one or more applications, components, functions, virtual machines or containers executing on one or more physical processing nodes in one or more networks).

In some embodiments, some or all of the functions described herein may be implemented as virtual components executed by one or more virtual machines implemented in one or more virtual environments 1100 hosted by one or more of hardware nodes 1130. Further, in embodiments in which the virtual node is not a radio access node or does not require radio connectivity (e.g., a core network node), then the network node may be entirely virtualized.

The functions may be implemented by one or more applications 1120 (which may alternatively be called software instances, virtual appliances, network functions, virtual nodes, virtual network functions, etc.) operative to implement some of the features, functions, and/or benefits of some of the embodiments disclosed herein. Applications 1120 are run in virtualization environment 1100 which provides hardware 1130 comprising processing circuitry 1160 and memory 1190. Memory 1190 contains instructions 1195 executable by processing circuitry 1160 whereby application 1120 is operative to provide one or more of the features, benefits, and/or functions disclosed herein.

Virtualization environment 1100, comprises general-purpose or special-purpose network hardware devices 1130 comprising a set of one or more processors or processing circuitry 1160, which may be commercial off-the-shelf (COTS) processors, dedicated Application Specific Integrated Circuits (ASICs), or any other type of processing circuitry including digital or analog hardware components or special purpose processors. Each hardware device may comprise memory 1190-1 which may be non-persistent memory for temporarily storing instructions 1195 or software executed by processing circuitry 1160. Each hardware device may comprise one or more network interface controllers (NICs) 1170, also known as network interface cards, which include physical network interface 1180. Each hardware device may also include non-transitory, persistent, machine-readable storage media 1190-2 having stored therein software 1195 and/or instructions executable by processing circuitry 1160. Software 1195 may include any type of software including software for instantiating one or more virtualization layers 1150 (also referred to as hypervisors), software to execute virtual machines 1140 as well as software allowing it to execute functions, features and/or benefits described in relation with some embodiments described herein.

Virtual machines 1140, comprise virtual processing, virtual memory, virtual networking or interface and virtual storage, and may be run by a corresponding virtualization layer 1150 or hypervisor. Different embodiments of the instance of virtual appliance 1120 may be implemented on one or more of virtual machines 1140, and the implementations may be made in different ways.

During operation, processing circuitry 1160 executes software 1195 to instantiate the hypervisor or virtualization layer 1150, which may sometimes be referred to as a virtual machine monitor (VMM). Virtualization layer 1150 may present a virtual operating platform that appears like networking hardware to virtual machine 1140.

As shown in FIG. 11, hardware 1130 may be a standalone network node with generic or specific components. Hardware 1130 may comprise antenna 11225 and may implement some functions via virtualization. Alternatively, hardware 1130 may be part of a larger cluster of hardware (e.g. such as in a data center or customer premise equipment (CPE)) where many hardware nodes work together and are managed via management and orchestration (MANO) 11100, which, among others, oversees lifecycle management of applications 1120.

Virtualization of the hardware is in some contexts referred to as network function virtualization (NFV). NFV may be used to consolidate many network equipment types onto industry standard high volume server hardware, physical switches, and physical storage, which can be located in data centers, and customer premise equipment.

In the context of NFV, virtual machine 1140 may be a software implementation of a physical machine that runs programs as if they were executing on a physical, non-virtualized machine. Each of virtual machines 1140, and that part of hardware 1130 that executes that virtual machine, be it hardware dedicated to that virtual machine and/or hardware shared by that virtual machine with others of the virtual machines 1140, forms a separate virtual network elements (VNE).

Still in the context of NFV, Virtual Network Function (VNF) is responsible for handling specific network functions that run in one or more virtual machines 1140 on top of hardware networking infrastructure 1130 and corresponds to application 1120 in FIG. 11.

In some embodiments, one or more radio units 11200 that each include one or more transmitters 11220 and one or more receivers 11210 may be coupled to one or more antennas 11225. Radio units 11200 may communicate directly with hardware nodes 1130 via one or more appropriate network interfaces and may be used in combination with the virtual components to provide a virtual node with radio capabilities, such as a radio access node or a base station.

In some embodiments, some signalling can be affected with the use of control system 11230 which may alternatively be used for communication between the hardware nodes 1130 and radio units 11200.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features and advantages of the enclosed embodiments will be apparent from the description.

The term unit may have conventional meaning in the field of electronics, electrical devices and/or electronic devices and may include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

The term "A and/or B" as used herein covers embodiments having A alone, B alone, or both A and B together. The term "A and/or B" may therefore equivalently mean "at least one of any one or more of A and B".

Some of the embodiments contemplated herein are described more fully with reference to the accompanying drawings. Other embodiments, however, are contained within the scope of the subject matter disclosed herein. The disclosed subject matter should not be construed as limited to only the embodiments set forth herein; rather, these embodiments are provided by way of example to convey the scope of the subject matter to those skilled in the art.

Notably, modifications and other embodiments of the disclosed invention(s) will come to mind to one skilled in the art having the benefit of the teachings presented in the foregoing descriptions and the associated drawings. Therefore, it is to be understood that the invention(s) is/are not to be limited to the specific embodiments disclosed and that modifications and other embodiments are intended to be included within the scope of this disclosure. Although specific terms may be employed herein, they are used in a generic and descriptive sense only and not for purposes of limitation.

What is claimed is:

1. A method performed by a first communication endpoint in a communication network, the method comprising:

receiving, from a second communication endpoint in the communication network, signaling that indicates a format according to which the second communication endpoint will serialize and/or deserialize data to be communicated between the first and second communication endpoints, wherein the format according to which the second communication endpoint serializes and/or deserializes data is a second format; and processing serialized data received from the second communication endpoint, according to the format indicated by the received signaling, wherein the serialized data received from the second communication endpoint is serialized according to the second format, and wherein processing the serialized data received from the second communication endpoint comprises translating the received serialized data from the second format to a first format according to which the first communication endpoint serializes and/or deserializes data.

2. The method of claim 1, wherein receiving the signaling comprises receiving the signaling:

over a control plane interface that is different than a data interface over which data is to be communicated between the first communication endpoint and the second communication endpoint; and/or at a layer of a communication protocol stack that is higher than a layer of the communication protocol stack at which serialized data is to be communicated between the first communication endpoint and the second communication endpoint.

3. The method of claim 1, wherein receiving the signaling comprises receiving the signaling in a message that is separate from a message in which serialized data is received from the second communication endpoint.

4. The method of claim 1, further comprising generating serialized data to be transmitted to the second communication endpoint.

5. The method of claim 4, wherein generating serialized data to be transmitted to the second communication endpoint comprises:

serializing data according to the first format and translating the serialized data from the first format to the second format, for transmission to the second communication endpoint.

6. The method of claim 4, further comprising obtaining, based on the format indicated by the received signaling, one or more data structures at the first communication endpoint for performing said generating and/or said processing, wherein the one or more data structures are stored persistently in memory across multiple exchanges of serialized data between the first and second communication endpoints.

7. The method of claim 6, wherein the one or more data structures include one or more translation tables that indicate read and/or write operations on a byte-by-byte or chunk-by-chunk basis for translating serialized data between the format indicated by the received signaling and a format according to which the first communication endpoint serializes and/or deserializes data.

8. The method of claim 1, wherein the first and second formats differ in terms of at least one of any one or more of:

into which message types and/or message fields data is structured;

a byte offset, within a byte stream that represents a message, at which each message field is respectively serialized;

an order in which message fields are serialized; and a default value for at least one message field.

9. The method of claim 1, wherein the data comprise data on how the first and second communication endpoints are to share frequency spectrum and/or aggregate frequency carriers.

10. The method of claim 1, wherein processing the serialized data received from the second communication endpoint further comprises, after translating the received serialized data from the second format to the first format, de-serializing the translated serialized data according to the first format.

11. A first communication endpoint configured for use in a communication network, the first communication endpoint comprising:

communication circuitry; and processing circuitry configured to:

receive, via the communication circuitry, from a second communication endpoint in the communication network, signaling that indicates a format according to which the second communication endpoint will serialize and/or deserialize data to be communicated between the first and second communication endpoints, wherein the format according to which the second communication endpoint serializes and/or deserializes data is a second format; and process serialized data received from the second communication endpoint, according to the format indicated by the received signaling, wherein the serialized data received from the second communication endpoint is serialized according to the second format, wherein the processing circuitry is configured to translate the received serialized data from the second format to a first format according to which the first communication endpoint serializes and/or deserializes data.

12. The first communication endpoint of claim 11, wherein the processing circuitry is further configured to generate serialized data to be transmitted to the second communication endpoint.

13. The first communication endpoint of claim 12, wherein the processing circuitry is configured to serialize data according to the first format and translate the serialized data from the first format to the second format, for transmission to the second communication endpoint.

14. The first communication endpoint of claim 12, wherein the processing circuitry is configured to obtain, based on the format indicated by the received signaling, one or more data structures at the first communication endpoint for generating the serialized data to be transmitted to the second communication endpoint, wherein the one or more data structures are stored persistently in memory across multiple exchanges of serialized data between the first and second communication endpoints.

15. The first communication endpoint of claim 14, wherein the one or more data structures include one or more translation tables that indicate read and/or write operations on a byte-by-byte or chunk-by-chunk basis for translating serialized data between the format indicated by the received signaling and a format according to which the first communication endpoint serializes and/or deserializes data.

16. The first communication endpoint of claim 11, wherein the processing circuitry is configured to receive the signaling:

over a control plane interface that is different than a data interface over which data is to be communicated between the first communication endpoint and the second communication endpoint; and/or at a layer of a communication protocol stack that is higher than a layer of the communication protocol stack at which serialized data is to be communicated between the first communication endpoint and the second communication endpoint.

17. The first communication endpoint of claim 11, wherein the processing circuitry is configured to receive the signaling in a message that is separate from a message in which serialized data is received from the second communication endpoint.

18. The first communication endpoint of claim 11, wherein the first and second formats differ in terms of at least one of any one or more of:

into which message types and/or message fields data is structured;
    a byte offset, within a byte stream that represents a message, at which each message field is respectively serialized;
    an order in which message fields are serialized; and
    a default value for at least one message field.

19. The first communication endpoint of claim 11, wherein the data comprise data on how the first and second communication endpoints are to share frequency spectrum and/or aggregate frequency carriers.

20. The first communication endpoint of claim 11, wherein the processing circuitry is further configured to, after translating the received serialized data from the second format to the first format, de-serialize the translated serialized data according to the first format.

21. A non-transitory computer-readable storage medium on which is stored instructions that, when executed by a processor of first communication endpoint configured for use in a communication network, causes the first communication endpoint to:

receive, via the communication circuitry, from a second communication endpoint in the communication network, signaling that indicates a format according to which the second communication endpoint will serialize and/or deserialize data to be communicated between the first and second communication endpoints, wherein the format according to which the second communication endpoint serializes and/or deserializes data is a second format; and process serialized data received from the second communication endpoint, according to the format indicated by the received signaling, wherein the serialized data received from the second communication endpoint is serialized according to the second format, wherein the processing circuitry is configured to translate the received serialized data from the second format to a first format according to which the first communication endpoint serializes and/or deserializes data.

* * * * *